United States Patent [19]
Itoh et al.

[11] Patent Number: 6,091,472
[45] Date of Patent: Jul. 18, 2000

[54] FERROELECTRIC LCD WITH PARTICULAR RUBBING DIRECTIONS

[75] Inventors: Nobuyuki Itoh, Noda; Masami Kido, Kashiwa, both of Japan

[73] Assignees: Sharp Kabushiki Kaisha, Osaka, Japan; The Secretary of State for Defence in Her Brittanic Majesty's Government of the United Kingdom of Great Britain and Northern Ireland, Hants, United Kingdom

[21] Appl. No.: 08/752,923

[22] Filed: Nov. 20, 1996

[30] Foreign Application Priority Data

Nov. 24, 1995 [JP] Japan .................................. 7-306232

[51] Int. Cl.$^7$ ..................... G02F 1/141; G02F 1/1337; G02F 1/1343
[52] U.S. Cl. ..................... 349/133; 349/126; 349/144
[58] Field of Search ..................... 349/123, 126, 349/85, 144, 133, 171, 172

[56] References Cited

U.S. PATENT DOCUMENTS

| | | | |
|---|---|---|---|
| 4,763,995 | 8/1988 | Katagiri et al. | 349/156 |
| 5,007,716 | 4/1991 | Hanyu et al. | 350/336 |
| 5,523,128 | 6/1996 | Itoh et al. | 428/1 |
| 5,539,546 | 7/1996 | Koden et al. | 349/171 |

FOREIGN PATENT DOCUMENTS

| | | |
|---|---|---|
| 0532210 | 3/1993 | European Pat. Off. . |
| 61-205919 | 9/1986 | Japan . |
| 63-116126 | 5/1988 | Japan . |
| 03100520 | 4/1991 | Japan . |
| 3243921 | 10/1991 | Japan . |
| 05181150 | 7/1993 | Japan . |
| 8292422 | 11/1996 | Japan . |

OTHER PUBLICATIONS

Itoh, et al, Liquid Crystals, 1993, vol. 15, No. 5,669–687, "Study of Molecular Orientational States of Ferroelectric Liquid Crystals in a Surface Stabilized Geometry".

Kanbe, et al, Ferroelectrics, 1991, vol. 114, pp. 3–26 "High Resolution, Large Area FLC Display with High Graphic Performance".

Koden, et al, Ferroelectrics 1993, vol. 149, pp. 183–192 "Ferroelectric Liquid Crystal Device Using the t–V min Mode".

Koden, et al, Jpn. J. Appl. Phys. vol. 33 (1994) pp. 1972–1976, Part I, No. 4A, Apr. 1994, "Novel Switching with Gray Scale in Surface–Stabilized Ferroelectric Liquid Crystal Devices".

Koden, et al, Reprinted from Japanese Journal of Applied Physics, vol. 30, No. 10B, Oct., 1991, pp. L 1823–L1825, "The States of Surface–Stabilized Ferroelectric Liquid Crystal with High–Pretilt Aligning Film".

Search Report for EPO Application No. 96308438.9–2205; Dated Nov. 5, 1997.

Korean Industrial Property Office Action for Application No. 10–1996–0056886; Dated Mar. 22, 1999.

*Primary Examiner*—William L. Sikes
*Assistant Examiner*—Toan Ton
*Attorney, Agent, or Firm*—Renner, Otto, Boisselle & Sklar

[57] ABSTRACT

For a liquid crystal display apparatus, an orientating film of an electrode substrate including more signal electrodes than scanning electrodes in a predetermined range receives a uniaxial orientation treatment parallelly or almost parallelly to a lengthwise direction of the signal electrodes. Besides, an orientating film of an electrode substrate including the scanning electrodes receives a uniaxial orientation treatment perpendicularly or almost perpendicularly to a lengthwise direction of the scanning electrodes. The electrode substrates are combined so that the directions of the uniaxial orientation treatment of the orientation films become parallel to each other. This enables growth of a smectic layer to be less frequently hindered by differences in level caused by the electrodes. Thus a uniform C2U orientation can be obtained easily. Consequently, the liquid crystal display apparatus realizes a uniform orientational state with no defects and uniform and high-contrast display properties.

21 Claims, 23 Drawing Sheets

RUBBING DIRECTION

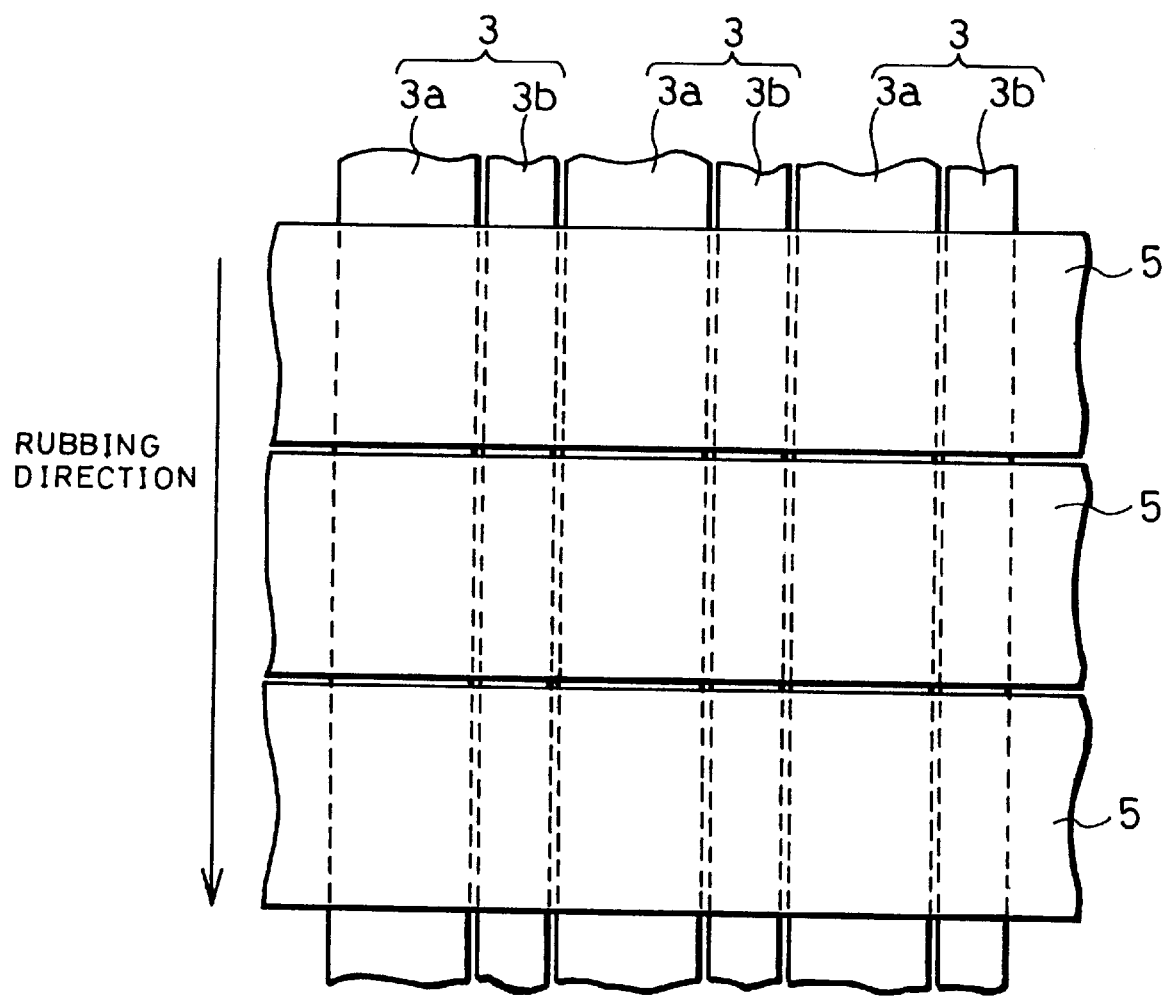

RUBBING DIRECTION

RUBBING DIRECTION

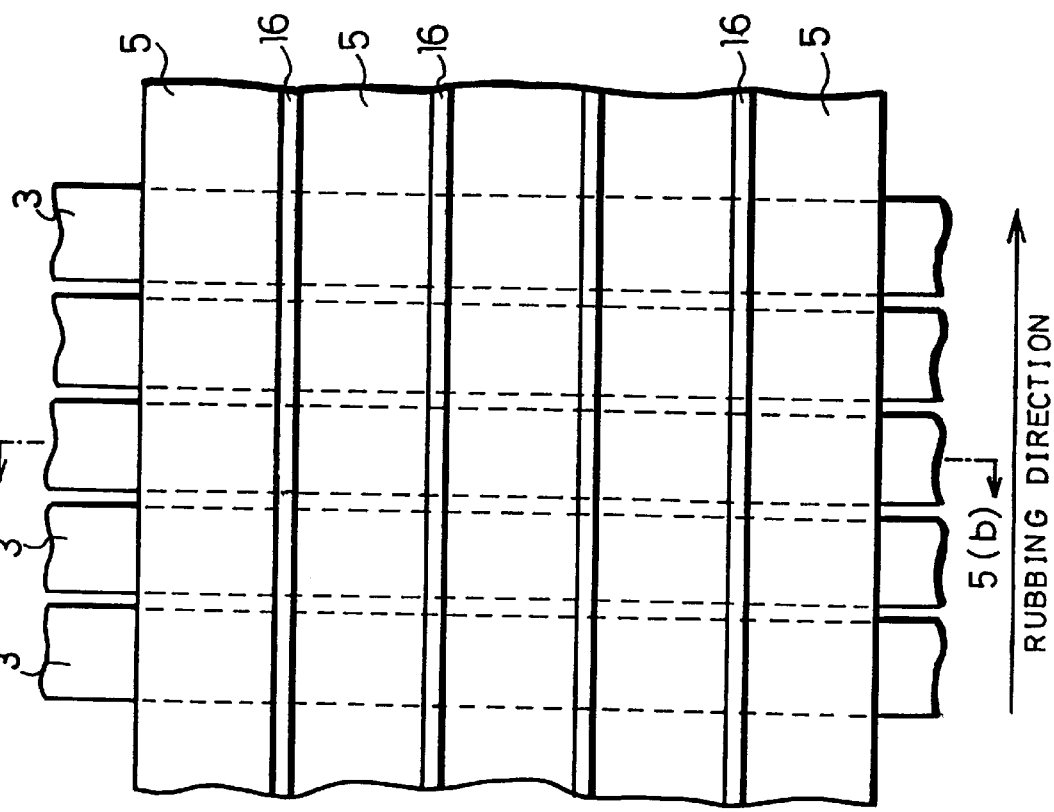
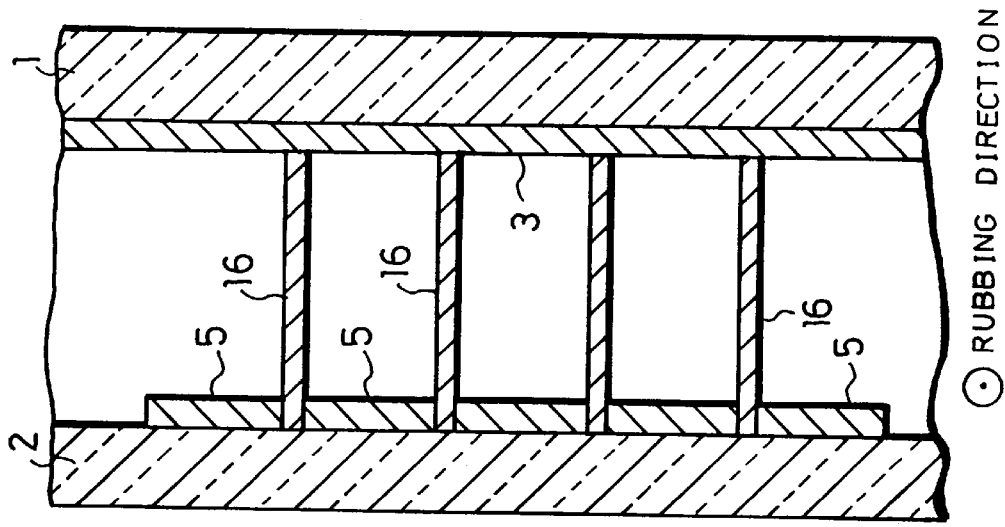

RUBBING DIRECTION

RUBBING DIRECTION

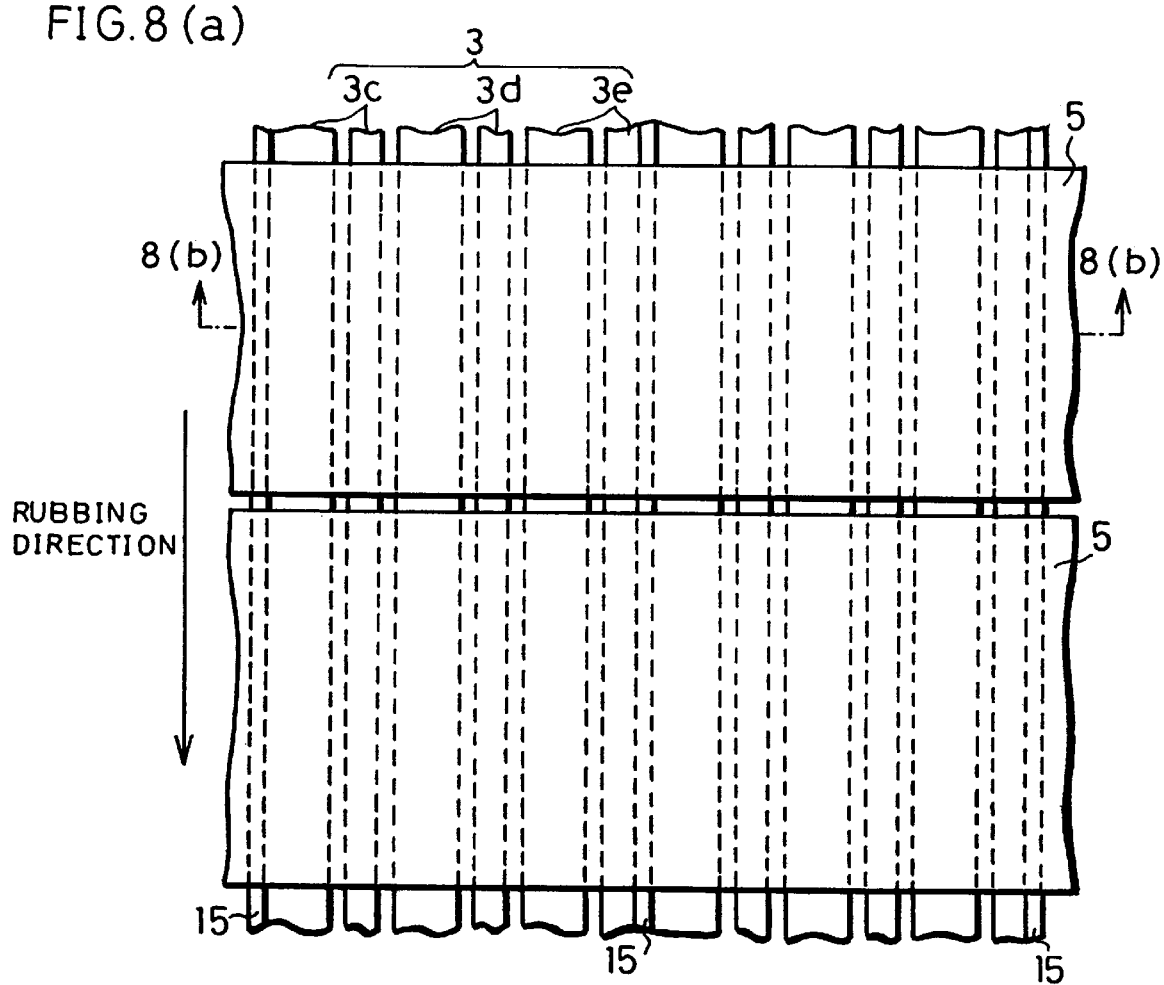
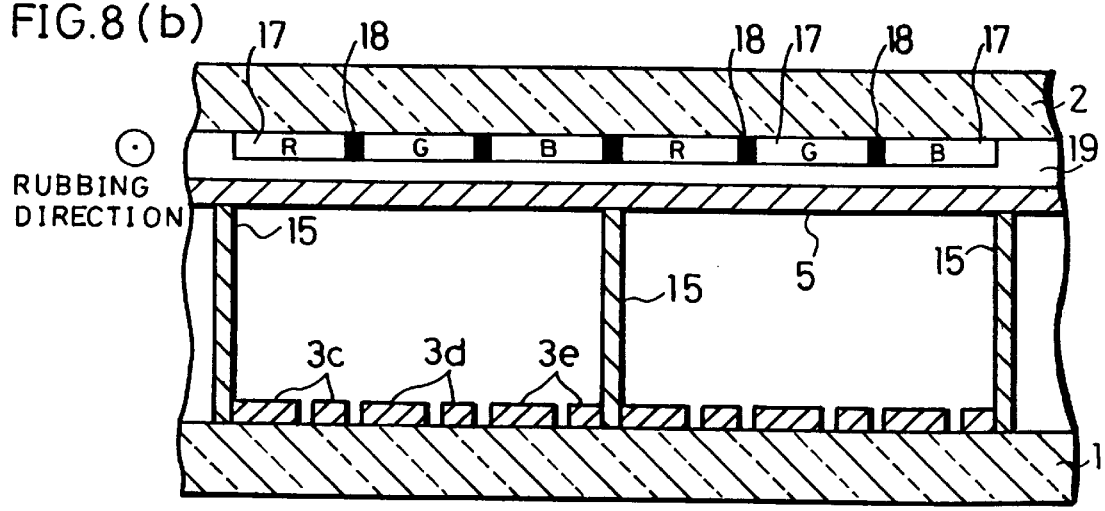

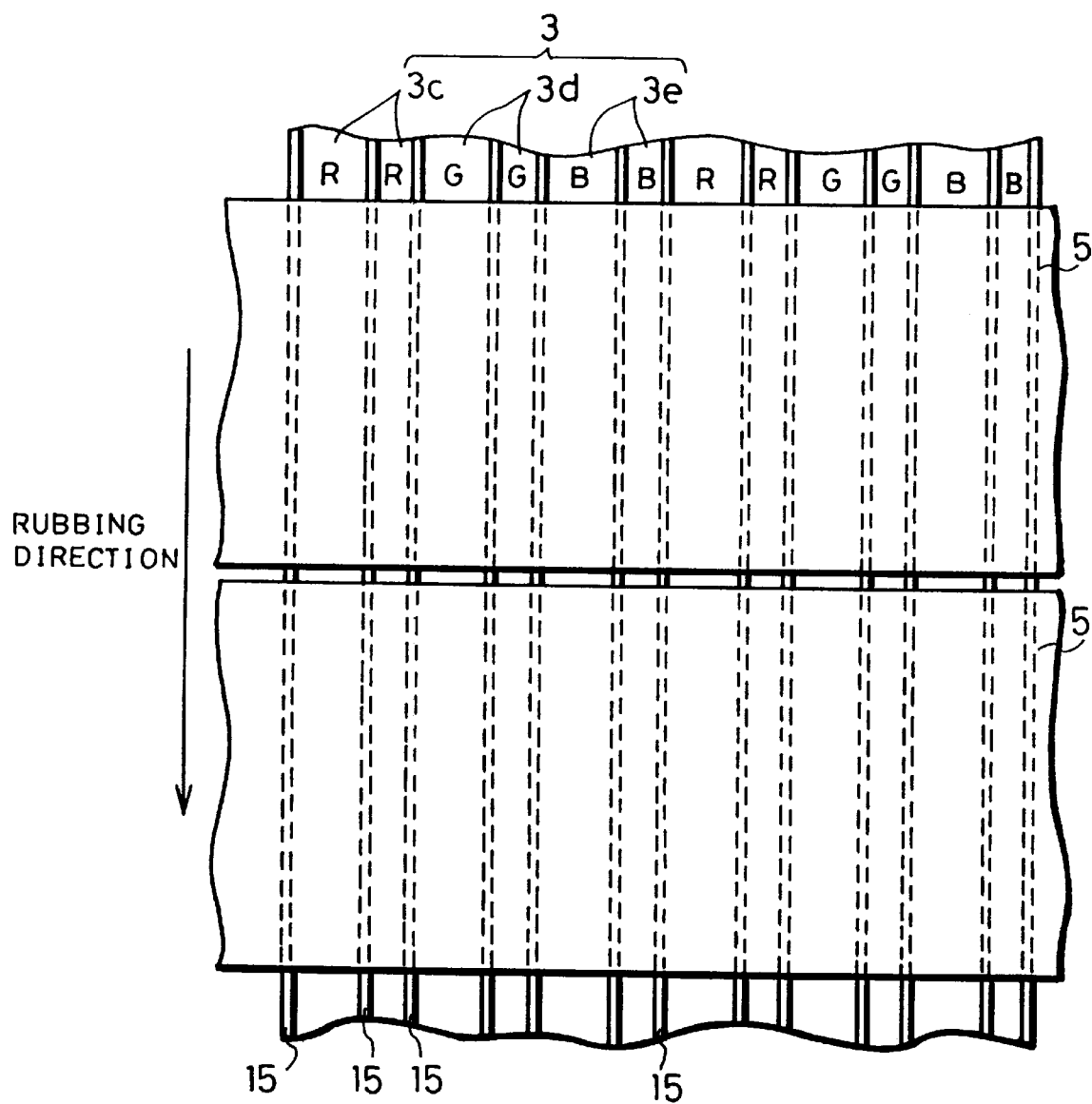

RUBBING DIRECTION

RUBBING DIRECTION

RUBBING DIRECTION

RUBBING DIRECTION

RUBBING DIRECTION

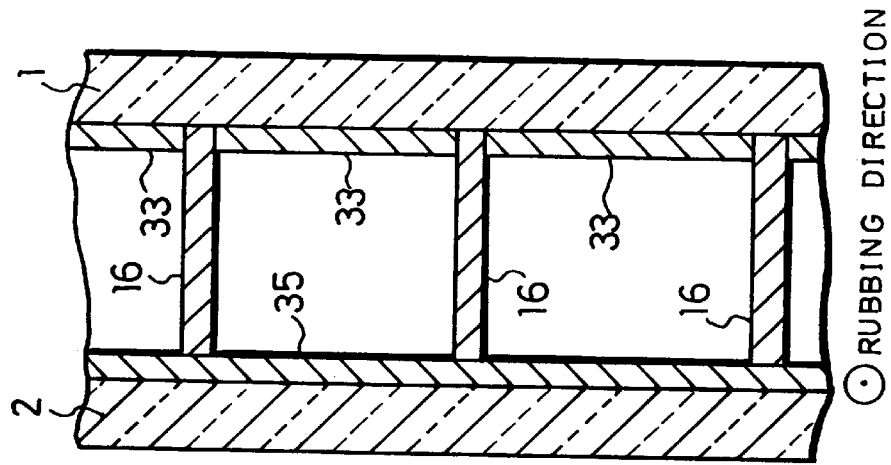
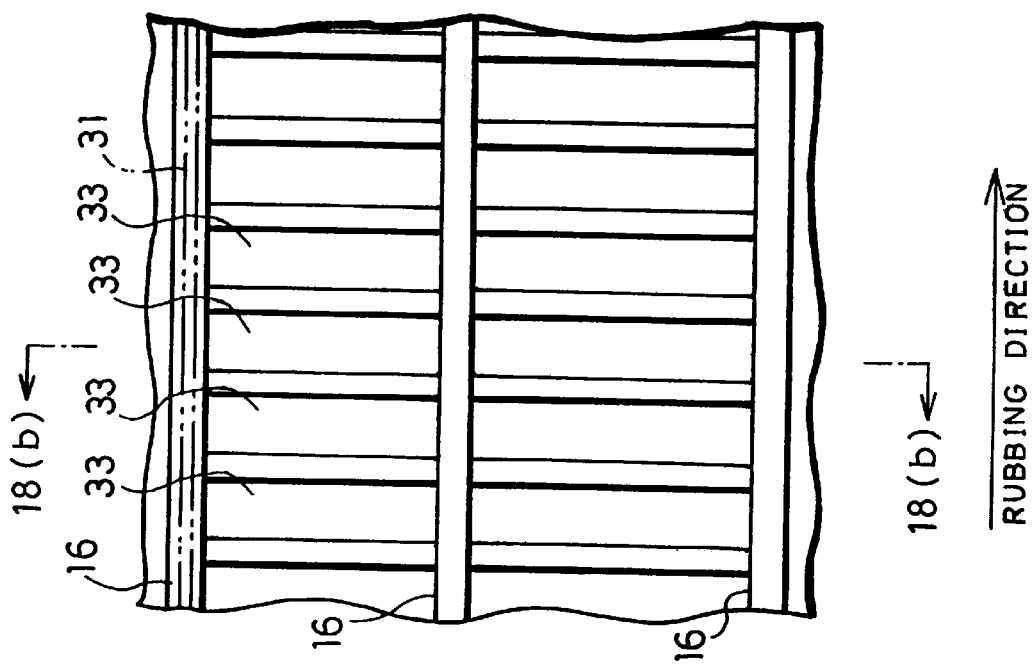
FIG. 18(a)
FIG. 18(b)

RUBBING DIRECTION

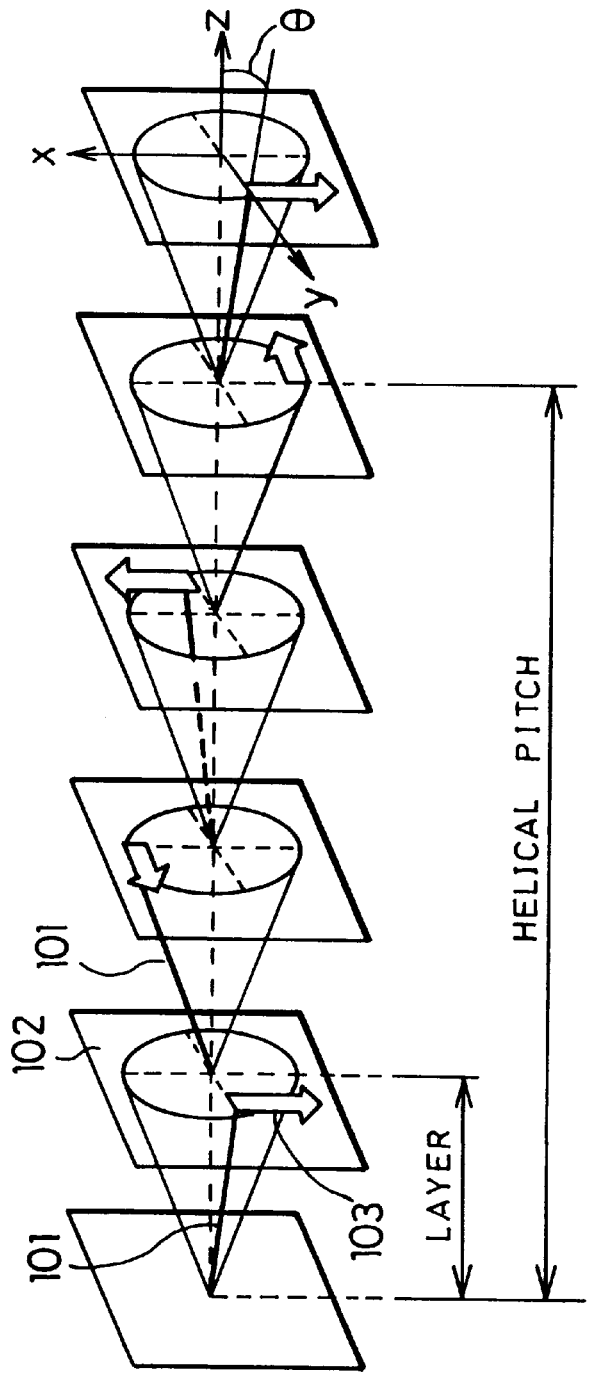
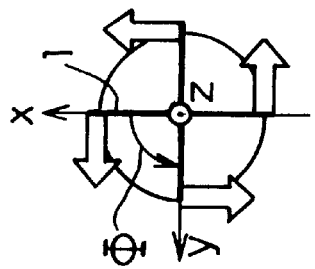
FIG. 20(a)
FIG. 20(b)

FERROELECTRIC LCD WITH PARTICULAR RUBBING DIRECTIONS

FIELD OF THE INVENTION

The present invention relates to a liquid crystal display apparatus using ferroelectric liquid crystal, and more particularly to a liquid crystal display apparatus configured so as to eliminate defective orientation.

BACKGROUND OF THE INVENTION

Conventionally, nematic crystal has been typically used for liquid crystal display apparatuses. Such liquid crystal display apparatuses include Twisted Nematic (TN) type liquid crystal display apparatuses and Super-Twisted Nematic (STN) type liquid crystal display apparatuses which have been improved from the TN type liquid crystal display apparatuses.

For the TN type liquid crystal display apparatus, since threshold characteristics of light transmittance dependent on voltage show a response which is not quick enough, a drive margin becomes narrower as drive system is made highly multiplex and enough contrast cannot be obtained. The STN type liquid crystal display apparatus is able to solve this defect by orientating liquid crystal molecules with a large twist angle. However, the STN type liquid crystal display apparatus deteriorates in contrast and response speed when applied for a large capacity display.

To solve the defect, N. A. Clark and S. T. Lagerwall suggests in "Applied Physics Letters" 36, (1980) p. 899–901, a liquid crystal display apparatus using chiral smectic C liquid crystal, i.e., ferroelectric liquid crystal. The liquid crystal display apparatus uses turning force to conform the polarity of spontaneous polarization of the ferroelectric liquid crystal and the polarity of an electric field, instead of driving nematic liquid crystal using dielectric anisotropy of liquid crystal molecules.

As shown in FIGS. 20(a) and 20(b), the ferroelectric liquid crystal in a bulk state has, over a helical pitch, a molecule arrangement where the longer axes of liquid crystal molecules 101 are inclined by a definite angle θ to the normal z of a layer surface 102 forming a boundary with a smectic layer, and the inclination direction revolves around the normal z from layer to layer by a definite angle Φ. Each liquid crystal molecule 101 has spontaneous polarization 103 perpendicular to both the longer axis and the normal z.

The ferroelectric liquid crystal un winds the helical structure when injected into a cell 104 where two electrode substrates provided with polarizing plates are combined with a smaller gap therebetween than the helical pitch, as shown in FIG. 21(a). This creates coexistence of two stable states: a domain where the liquid crystal molecules 101 are stable when tilted to the normal z by the tilt angle +θ and a domain where the liquid crystal molecules 101 are stable when tilted to the normal z by the tilt angle −θ in the opposite direction.

Then, an electric field is applied to the ferroelectric liquid crystal in a state where the longer axes of the liquid crystal molecules 101 agree with the polarizing axis 105 of one of the polarizing plates. Thus, the longer axis and the direction of the spontaneous polarization 103 of the liquid crystal molecule 101 agree as shown in FIG. 21(b). Here, if a negative electric field is applied, since double-refraction effect does not occur, incident light is not double-refracted. From this state, as shown in FIG. 21(c), a switching operation of switching the orientation of the liquid crystal molecules 101 from a definite state to another state is carried out by switching the polarity of the applied electric field.

Incident light is double-refracted in the ferroelectric liquid crystal in the cell 104 for these reasons. Therefore, light transmission is controlled by holding the cell 104 with two polarizers so as to create a dark state (FIG. 21(b)) and a bright state (FIG. 21(c)).

In addition, if the electric field is removed, the orientation of the liquid crystal molecules 101 is maintained by orientation anchoring force of the boundary plane so as to be in a state when the electric field is applied. This is a feature of memory effect of ferroelectric liquid crystal. Moreover, since the electric field directly affects the spontaneous polarization 103, the switching can respond quickly, within less than one thousandth of the time of nematic liquid crystal display apparatuses. A quick display becomes possible in this manner.

Ferroelectric liquid crystal has useful characteristics, such as a wide viewing angle as well as the above-mentioned bistability, memory effect and quick response. Therefore, in recent years, a lot of efforts have been made to apply ferroelectric liquid crystal to liquid crystal display apparatuses of high definition and a large capacity.

However, the aforementioned ferroelectric liquid crystal has a lot of problems. First of all, since chiral smectic C phase liquid crystal showing ferroelectricity has molecular environment of low symmetry and high crystallinity, compared to ordinary nematic liquid crystal, it is difficult to orient molecules uniformly. Therefore, it is difficult to realize uniform display.

Initial studies about ferroelectric liquid crystal assumed that ferroelectric liquid crystal had a layer structure called a bookshelf type where the smectic C phases are arranged perpendicularly to the substrate. However, it has been found out in a cell made according to a uniaxial orientation method of conventional rubbing and the like that switching phenomena and optical characteristics greatly differ from those expected and that a switching operation totally different from a suggested molecular orientational model is carried out.

It is found out with a small angle scattering method using X ray that this is mainly caused by a mid-bent structure called chevron of each smectic layer 107 formed between substrates 106 as shown in FIG. 22. The structure has C1 and C2 states according to relationship between a pretilt angle at a boundary plane of the liquid crystal and the substrate 106 and the twist direction of the smectic layer 107 as shown in FIGS. 23(b) and 23(c). There is another classification for the structure: uniform orientation where liquid crystal molecules are uniformly oriented between the opposite substrates 106, and a twisted orientation where the liquid crystal molecules are twisted and oriented.

Since the molecules are almost uniaxially oriented in the uniform orientation, the uniform orientation shows extinction positions with the two polarizing plates whose polarization axes perpendicularly cross. Nevertheless, the twisted orientation shows no extinction positions, since the twisted molecules generate rotatory polarization. Consequently, ferroelectric liquid crystal exhibits four orientational states: C1U (C1-Uniform), C2U (C2-Uniform), C1T (C1-Twisted) and C2T (C2-Twisted) (see "LIQUID CRYSTALS" 1993, Vol. 15, No. 5, p. 669–p. 687).

Among these orientations, the C2U orientation is appropriate for display apparatuses, because, for example, the C2U orientation produces high contrast (see "Ferroelectrics" 1993, Vol. 149, pp. 183–192 and "JAPANESE JOURNAL OF APPLIED PHYSICS" VOL. 33, No. 4A, APRIL, 1994, pp. 1972–1976).

In the chevron structure, so-called zig zag defects are observed where the smectic layers 107 incline in different directions as shown in FIG. 23(a). There are two kinds of zig zag defects: a roundly-curving hairpin defect occurring in the rubbing direction and a sharply-turning lightening defect occurring in the opposite direction from the rubbing direction.

It is needless to say that these defects pose a problem in obtaining uniform display characteristics, and optical characteristics vary greatly depending upon orientational states sandwiching the defects. Therefore, in order to prevent the zig zag defects from occurring, it is important to control bending direction of the smectic layer to be uniform (see "LIQUID CRYSTAL").

A state where the uniform orientation and the twisted orientation coexist in mixture results in low contract and flickering in display, and therefore is not preferable for a display apparatus. It is assumed that the uniform and twisted orientations are determined by spontaneous twisting force of the liquid crystal, molecular interaction between the liquid crystal and an orientating film, polarity energy and the like. Therefore, the effects of the coexistence of the two orientations are controlled by adjusting combination of materials for the liquid crystal and the orientating film.

Meanwhile, it is assumed that stability of the C1 and C2 states are determined by geometric effects, such as a relation between a layer inclination angle and a tilt angle of the liquid crystal and a pretilt angle $\theta_p$ of the orientating film (FIG. 23(b)). Therefore, conventionally, it is suggested to control the relation of the angles (see "Ferroelectrics" 1991, Vol. 114, pp. 3–26). However, since the control is incomplete, the control is not a practical and effective solution.

This is presumably because the inclination direction of the smectic layer 107 reverses suddenly not only because of the relation between the tilt angle and the layer inclination angle of the liquid crystal and the pretilt angle, but also because of a foreign substance like a spacer disposed between the substrates as disclosed in Japanese Laid-Open Patent Application No. 1-179915/1989 (Tokukaihei 1-179915). In this case, it is assumed that the spacer serves as a core causing the zig zag defects.

Since chiral smectic C liquid crystal has high crystallinity and low fluidity, a mechanical shock breaks smectic layer structure thereof. Therefore chiral smectic C liquid crystal does not return to the original orientational state unless heated up to a temperature higher than a temperature where chiral smectic C liquid crystal exhibits a nematic phase. In order to solve this problem, a shock weakening method needs to be adopted.

For example, Japanese Publication for Examined Patent Application No. 2-17007/1990 (Tokukouhei 2-17007) suggests provision of a cylindrical or a strap-shaped protrusion in a cell, using photosensitive polyimide and the like. Besides, Japanese Laid-Open Patent Application No. 63-116126/1988 (Tokukaishou 63-116126) suggests solid bonding of opposite substrates with adhesive spacers. The protrusion and the spacers suggested in these methods prevent the substrates from bending with a shock, and therefore the shock does not reach the crystal liquid. However, these structures may result in a small interval between the spacers and thereby damage injectability of the liquid crystal. Therefore the liquid crystal may not injected into some pixels.

SUMMARY OF THE INVENTION

An object of the present invention is to provide a liquid crystal display apparatus capable of realizing a uniform orientational state with no defects and display with uniform and high-contrast properties. Another object of the present invention is to provide a liquid crystal display apparatus capable of maintaining good injectability of liquid crystal and preventing molecule orientation from being disturbed by a mechanical shock.

In order to achieve the above objects, a first liquid crystal display apparatus in accordance with the present invention includes:

a pair of transparent electrode substrates, each of which has: an insulating and transparent substrate; a plurality of electrodes disposed to form stripes on the substrate; and an orientating film to cover the electrodes, the electrode substrates being disposed to face each other so that the electrodes on one of the electrode substrates cross the electrodes on the other electrode substrate; and ferroelectric liquid crystal injected between the electrode substrates, wherein one of the electrode substrates provided with more electrodes in a predetermined range than the other receives a uniaxial orientation treatment parallelly or almost parallelly to a lengthwise direction of the electrodes thereof, the other electrode substrates receives a uniaxial orientation treatment perpendicularly or almost perpendicularly to a lengthwise direction of the electrodes thereof, and the electrode substrates are disposed so that the orientation directions thereof become parallel or almost parallel to each other.

With the above configuration, there exist on the electrode substrates electrode parts and substrate parts, i.e., exposed parts between neighboring electrodes. Since the electrode parts are conductors and the substrate parts are insulators, the electrode and substrate parts have different charging states. In addition, the electrode and substrate parts have surface energy of different polarity components and nonpolarity components. Therefore, the electrode and substrate parts have different effects on the ferroelectric liquid crystal through orientating films. Such difference in beds of the orientating films is a cause for hindering growth of a smectic layer.

On the other hand, with the above configuration, the orientations are in the same directions, i.e., parallel or almost parallel to a lengthwise direction of the electrodes of one of the electrode substrates, which are greater in number than the electrodes of the other electrode substrate in the predetermined range. Therefore, the smectic layer grows in the ferroelectric liquid crystal in a direction where there is smaller difference in the bed state of the orientating film. As a result, the growth of the smectic layer is less hindered, and a uniform orientational state can be obtained with no zig zag defects. Consequently, the uniform and high-contrast display properties can be obtained.

The first liquid crystal display apparatus, preferably, further includes interval maintaining bodies for maintaining an interval between the two electrode substrates and for combining the two electrode substrates, wherein the interval maintaining bodies are disposed, between neighboring pairs of the electrodes of one of the electrode substrates which is provided with more electrodes in the predetermined range than the other, parallelly to a lengthwise direction of those electrodes so as to form stripes.

Since the interval maintaining bodies are disposed along the orientation direction so as to form stripes in this manner, the growth of the smectic layer is not hindered by the interval maintaining bodies. Therefore, a uniform orientational state can be obtained with no zig zag defects. Besides, since the interval maintaining bodies combine the electrode substrates, the orientations are not disturbed by a mechanical shock. The shock resistant property is thus improved, and stable display properties can be obtained.

In order to achieve the above objects, a second liquid crystal display apparatus in accordance with the present invention includes:

a pair of transparent electrode substrates, each of which includes: an insulating and transparent substrate; a plurality of electrodes disposed to form stripes on the substrate; and an orientating film to cover the electrodes, the electrode substrates being disposed to face each other so that the electrodes on one of the electrode substrates cross the electrodes on the other electrode substrate; and ferroelectric liquid crystal injected between the electrode substrates, wherein one of the electrode substrates, which is provided with the narrowest electrode, receives a uniaxial orientation treatment parallelly or almost parallelly to a lengthwise direction of the electrodes thereof, the other electrode substrate receives a uniaxial orientation treatment perpendicularly or almost perpendicularly to a lengthwise direction of the electrodes thereof, and the electrode substrates are disposed so that the orientation directions thereof become parallel or almost parallel to each other.

With the above configuration, the orientations are in the same directions, i.e., parallel or almost parallel to a lengthwise direction of the narrowest electrode. Therefore, a smectic layer grows in the ferroelectric liquid crystal in a direction where there are less changes in the bed state of the orientating film. As a result, the growth of the smectic layer is less hindered, and a uniform orientational state can be obtained with no zig zag defects. Consequently, the uniform and high-contrast display properties can be obtained.

The second liquid crystal display apparatus, preferably, further includes interval maintaining bodies for maintaining an interval between the two electrode substrates and for combining the two electrode substrates, wherein the interval maintaining bodies are disposed, between neighboring pairs of the electrodes of one of the electrode substrates which is provided with the narrowest electrode, parallelly to a lengthwise direction of those electrodes so as to form stripes.

Since the interval maintaining bodies are disposed along the orientation direction so as to form stripes in this manner, the growth of the smectic layer is not hindered by the interval maintaining bodies. Therefore, a uniform orientational state can be obtained with no zig zag defects. Besides, since the interval maintaining bodies combine the electrode substrates, the orientations are not disturbed by a mechanical shock. The shock resistant property is thus improved, and stable display properties can be obtained.

In order to achieve the above objects, a third liquid crystal display apparatus in accordance with the present invention includes:

a pixel electrode substrate including an insulating and transparent substrate, a plurality of pixel electrodes disposed to form a matrix on the substrate, and an orientating film to cover the pixel electrodes;

an opposite electrode substrate including an insulating and transparent substrate, an opposite electrode disposed on the substrate, and an orientating film to cover the opposite electrode, the opposite electrode substrate being disposed to face the pixel electrode substrate so that the opposite electrodes and the pixel electrodes face each other; and ferroelectric liquid crystal injected between the pixel electrode substrate and the opposite electrode substrate, wherein the pixel electrode substrate receives a uniaxial orientation treatment parallelly or almost parallelly to a lengthwise direction of the pixel electrodes thereof, and the opposite electrode substrate receives a uniaxial orientation treatment parallelly or almost parallelly to the uniaxial orientation treatment of the pixel electrode substrate.

With the above configuration, the orientations of the electrode substrates are in the same directions, i.e., parallel or almost parallel to a lengthwise direction of the pixel electrodes. Therefore, a smectic layer grows in the ferroelectric liquid crystal in a direction where there are less changes in the bed state of the orientating film. As a result, the growth of the smectic layer is less hindered, and a uniform orientational state can be obtained with no zig zag defects. Consequently, the uniform and high-contrast display properties can be realized.

The third liquid crystal display apparatus, preferably, further includes interval maintaining bodies for maintaining an interval between the pixel electrode substrate and the opposite electrode substrate and for combining the electrode substrates, wherein the interval maintaining bodies are disposed between neighboring pairs of the pixel electrodes parallelly to a lengthwise direction of the pixel electrodes so as to form stripes.

Since the interval maintaining bodies are disposed along the orientation direction so as to form stripes in this manner, the growth of the smectic layer is not hindered by the interval maintaining bodies. Therefore, a uniform orientational state can be obtained with no zig zag defects. Besides, since the interval maintaining bodies combine the electrode substrates, the orientations are not disturbed by a mechanical shock. The shock resistant property is thus improved, and stable display properties can be obtained.

Besides, preferably, for one of the first, second and third liquid crystal display apparatuses having the interval maintaining bodies, the electrodes or pixel electrodes are provided in a plurality in the display area for one pixel, and the interval maintaining body is disposed in a boundary of neighboring display areas for one pixel. With such a configuration, the electrodes or pixel electrodes are structured appropriately to color display or space dividing gradation display in the display area for one pixel as detailed below.

For instance, if the above configuration includes a plurality of color filters in a display area for one pixel, and the electrodes or pixel electrodes in the display area for one pixel correspond to the respective color filters in the same display area, good display properties can be obtained with a liquid crystal display apparatus capable of carrying out color display.

Moreover, if the electrodes or pixel electrodes in a display area for one pixel are provided in accordance with a number of divisions for space dividing gradation display in the above configuration, good display properties can be obtained with a liquid crystal display apparatus capable of carrying out space dividing gradation display.

In addition, with the above configuration, since the interval maintaining bodies are disposed in the boundaries of the neighboring display areas for one pixel, intervals between the interval maintaining bodies cannot be too narrow. This facilitates a smooth injection of ferroelectric liquid crystal, and enables an enough amount of the ferroelectric liquid crystal to be injected into the pixels in a short period of time. Moreover, since the display area for one pixel is not divided by the interval maintaining bodies, the display properties in the pixel is not affected by the interval maintaining bodies. Therefore, non-uniformity in the injection of the liquid crystal can be prevented and good display properties can be obtained by adopting the present liquid crystal display.

For a fuller understanding of the nature and advantages of the invention, reference should be made to the ensuing detailed description taken in conjunction with the accompanying drawings.

BRIEF DESCRIPTION OF THE DRAWINGS

FIG. 1(*b*) is a plain view showing a structure of electrodes of the liquid crystal display apparatus.

FIG. 3 is a plain view showing a structure of electrodes of a liquid crystal display apparatus of a first variation example of the first embodiment in accordance with the present invention.

FIG. 4(*b*) is a cross-sectional view taken along line A–A' shown in the plain view of FIG. 4(*a*).

FIG. 5(*a*) is a plain view showing a structure of electrodes of a liquid crystal display apparatus whose rubbing direction is different from that of the liquid crystal display apparatus of the second variation example.

FIG. 5(*b*) is a cross-sectional view taken along line B–B' shown in the plain view of FIG. 5(*a*).

FIG. 6(*b*) is a cross-sectional view taken along line C–C' shown in the plain view of FIG. 6(*a*).

FIG. 7(*b*) is a cross-sectional view taken along line D–D' shown in the plain view of FIG. 7(*a*).

FIG. 8(*a*) is a plain view showing a structure of electrodes of even another liquid crystal display apparatus of a third variation example of the first embodiment in accordance with the present invention.

FIG. 8(*b*) is a cross-sectional view taken along line E–E' shown in the plain view of FIG. 8(*a*).

FIG. 9 is a plain view showing a structure of electrodes of a liquid crystal display apparatus having more spacers than the liquid crystal display apparatus having the electrodes shown in FIG. 8(*a*).

FIG. 10(*b*) is a plain view showing a structure of electrodes of the liquid crystal display apparatus shown in FIG. 10(*a*).

FIG. 13(*b*) is a cross-sectional view taken along line F–F' shown in the plain view of FIG. 13(*a*).

FIG. 14(*b*) is a cross-sectional view taken along line G–G' shown in the plain view of FIG. 14(*a*).

FIG. 15(*b*) is a plain view showing a structure of electrodes of the liquid crystal display apparatus shown in FIG. 15(*a*).

FIG. 17(*b*) is a cross-sectional view taken along line H–H' shown in the plain view of FIG. 17(*a*).

FIG. 18(*a*) is a plain view showing a structure of electrodes of a liquid crystal display apparatus whose rubbing direction is different from that of the liquid crystal display apparatus having the electrodes shown in FIG. 17(*a*).

FIG. 18(*b*) is a cross-sectional view taken along line I–I' shown in the plain view of FIG. 18(*a*).

FIG. 19(*b*) is a cross-sectional view taken along line J–J' shown in the plain view of FIG. 19(*a*).

FIG. 20(*a*) is a perspective view showing a model for arrangement of liquid crystal molecules in a smectic C phase.

FIG. 20(*b*) is a front view showing the arrangement of the liquid crystal molecules shown in FIG. 20(*a*) in a layer surface normal direction.

DESCRIPTION OF THE EMBODIMENTS

FIRST EMBODIMENT

Figure 1:
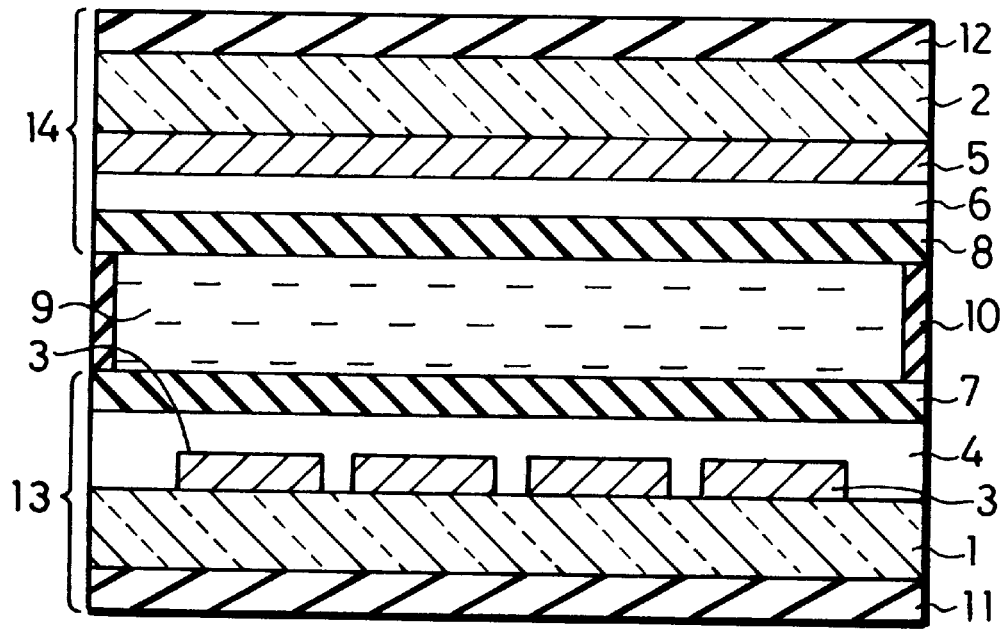
FIG. 1(*a*) is a cross-sectional view showing a structure of a main part of a liquid crystal display apparatus of a first embodiment in accordance with the present invention.
Figure 1:
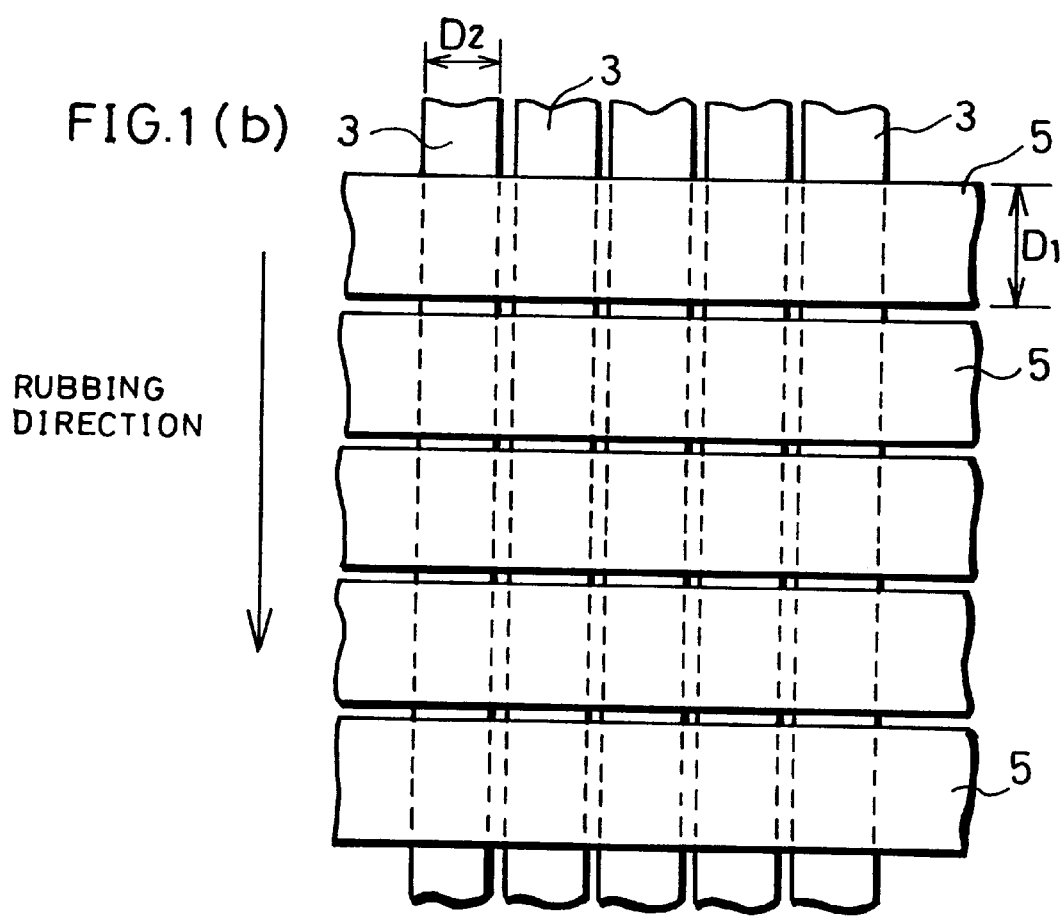

Referring to FIGS. 1 through 9, the following description will discuss a first embodiment in accordance with the present invention.

A liquid crystal display apparatus of the present embodiment includes a liquid crystal panel shown in FIG. 1(a). The liquid crystal panel has two glass substrates 1 and 2 facing each other. Substrates composed of resin, such as polymethyl methacrylate, may be used instead of the glass substrates 1 and 2 as long as such substrates have light transmitting and insulating properties.

On the surface of the glass substrate 1, a plurality of transparent signal electrodes 3 composed of, for example, indium tin oxide (ITO) are provided parallelly to each other. A transparent insulating film 4 composed of, for example, $SiO_2$ is laminated on the signal electrodes 3. Meanwhile, on the glass substrate 2, a plurality of transparent scanning electrodes 5 composed of the same material as the signal electrodes 3 are provided parallelly to each other so as to cross the signal electrodes 3 at right angles. On the scanning electrodes 5, a transparent insulating film 6 composed of the same material of the insulating film 4 is laminated.

Orientating films 7 and 8 having received a uniaxial orientation treatment such as rubbing treatment are provided on the insulating film 4 and the insulating film 6. The orientating films 7 and 8 are composed of organic high polymer film, such as a polyimide film, nylon film and polyvinyl film; an $SiO_2$ oblique evaporation film; and the like.

A polarizing plate 11 is provided on an opposite side of the glass substrate 1 to a side thereof on which the signal electrodes 3 are provided. Meanwhile, a polarizing plate 12 is provided on an opposite side of the glass substrate 2 to a side thereof on which the scanning electrodes 5 are provided. The polarizing plates 11 and 12 are disposed so that polarization axes thereof perpendicularly cross.

An electrode substrate 13 is composed of the glass substrate 1, signal electrodes 3, insulating film 4, orientating film 7 and polarizing plate 11 in the above manner. Meanwhile, an electrode substrate 14 is composed of the glass substrate 2, scanning electrodes 5, insulating film 6, orientating film 8 and polarizing plate 12.

Liquid crystal (ferroelectric liquid crystal) 9 fills a space formed between the electrode substrate 13 and the electrode substrate 14 bonded with a sealing agent 10.

As shown in FIG. 1(b), a square region which is formed by one of the signal electrodes 3 and one of the scanning electrodes 5 at the crossing point of the two electrodes is a pixel of the present liquid crystal display apparatus. The stripe-shaped scanning and signal electrodes 5 and 3 are formed to have uniform widths $D_1$ and $D_2$ respectively, and the scanning electrodes 5 are wider than the signal electrodes 3 ($D_1 > D_2$). Besides, the signal electrodes 3 and the scanning electrodes 5 are formed to have the same thickness.

Intervals between neighboring scanning electrodes 5 and those between neighboring signal electrodes 3 are all specified to be equal. Normally, an interval between neighboring electrodes (hereinafter, will be referred to as an electrode space) is specified to maximize the aperture ratio (the ratio of electrode parts serving for display) of a display apparatus. In practice, the electrode space is determined by restrictions in an electrode pattering process such as exposure, development, etching. Therefore, generally, the electrode space is specified to be constant in a display apparatus.

The number of the signal electrodes 3 and the scanning electrodes 5 are specified so that the number of pixels on a scanning electrode 5 and the number of pixels on a signal electrode 3 are equal in the present liquid crystal display apparatus. Therefore, there are an equal number of signal electrodes 3 and scanning electrodes 5 in a configuration in which a pixel is formed where one of the signal electrodes 3 and one of the scanning electrodes 5 cross. On the other hand, there are more signal electrodes 3 than scanning electrodes 5 in a configuration in which a signal electrode 3 forming one pixel is divided into a plural number like a liquid crystal display apparatus of a variation example mentioned later.

As to the electrode substrate 13, the orientating film 7 receives rubbing treatment parallelly or almost parallelly to a lengthwise direction of the signal electrodes 3. As to the electrode substrate 14, the orientating film 8 receives rubbing treatment perpendicularly or almost perpendicularly to a lengthwise direction of the scanning electrodes 5. The electrode substrates 13 and 14 are combined so that the directions of the rubbing treatment of the orientating film 7 and 8 become parallel to each other.

In the present liquid crystal display apparatus, one of the electrode substrates having more electrodes than the other in a predetermined range receives rubbing treatment parallelly (almost parallelly) to a lengthwise direction of those electrodes. Therefore, if the width $D_1$ of the scanning electrodes 5 is narrower than the width $D_2$ of the signal electrodes 3 ($D_1 < D_2$), the orientating films 7 and 8 receive the rubbing treatment in the opposite direction to the above direction.

For the present liquid crystal display apparatus configured in the above manner, conducting the rubbing treatment along the signal electrodes 3 results in a growth of a smectic layer in a direction with less differences in level caused by the electrodes on the substrates. This reduces effects of the differences in level where defects are more likely to occur, and the C2U orientation can be obtained over the whole surfaces of the electrode substrates 13 and 14.

Figure 2:
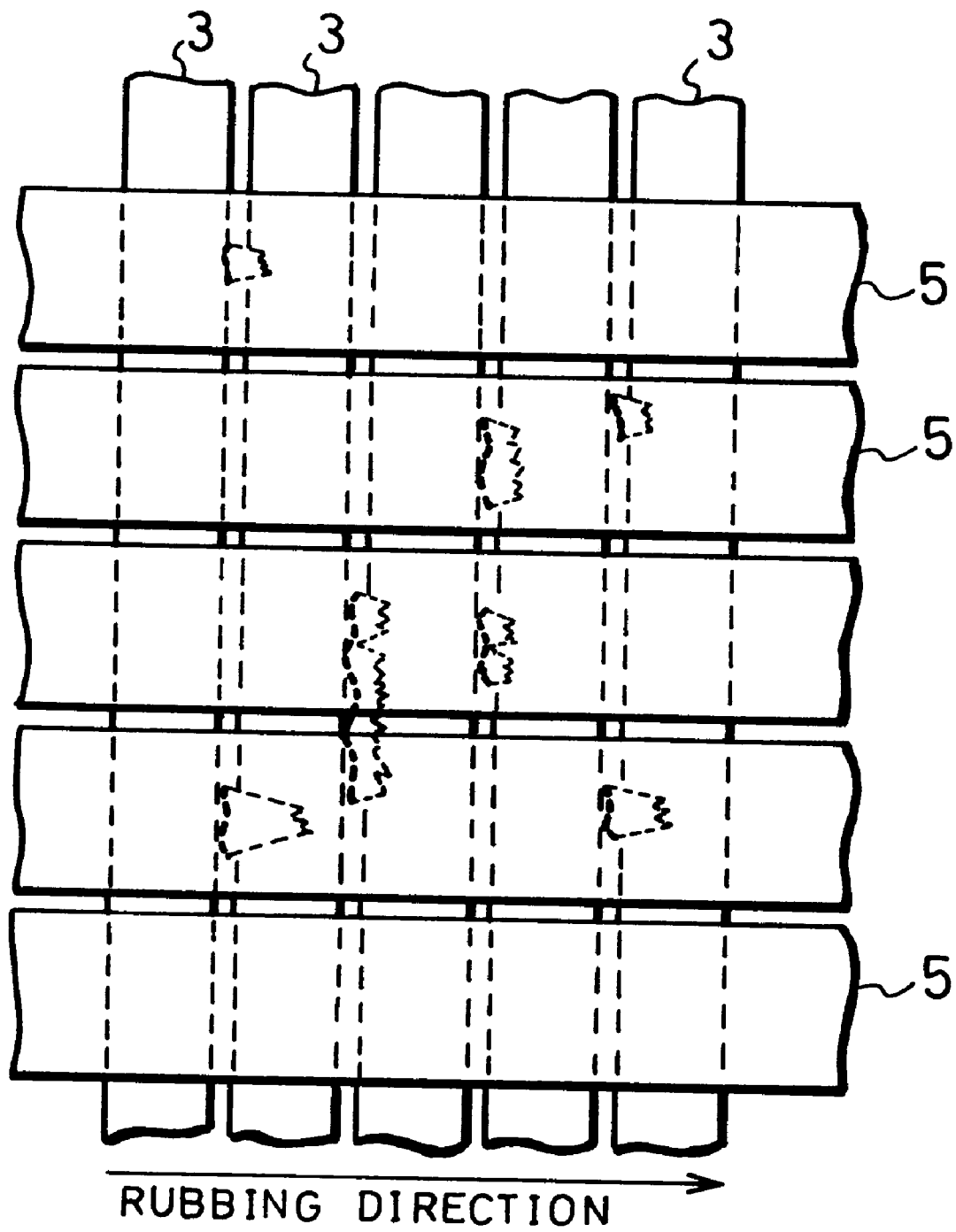
FIG. 2 is a plain view showing a relation between a structure of electrodes and zig zag defects of a liquid crystal display apparatus whose rubbing direction is different from that of the liquid crystal display apparatus shown in FIG. 1(*a*).

On the other hand, as to the electrode substrate 13 of the liquid crystal display apparatus shown in FIG. 2, the orientating film 7 receives rubbing treatment perpendicularly or almost perpendicularly to a lengthwise direction of the signal electrodes 3. Meanwhile, as to the electrode substrate 14, the orientating film 8 receives rubbing treatment parallelly or almost parallelly to a lengthwise direction of the scanning electrodes 5. In this case, that is, if the direction of the rubbing treatment is parallel to a lengthwise direction of the scanning electrodes 5, since the C2U and C1T orientations coexist in mixture, zig zag defects occur between neighboring signal electrodes 3 and extend in the rubbing direction.

Generally, ferroelectric liquid crystal changes with decreasing temperature from an isotropic phase, nematic phase, smectic A phase and then to a smectic C phase which is a ferroelectric phase. In the transition from the smectic A phase to the smectic C phase, the C1 orientation appears first and then the C2 orientation appears at a slightly lower temperature. (see "JAPANESE JOURNAL OF APPLIED PHYSICS" VOL. 30, No. 10B, OCTOBER, 1991, pp. L1823–L1825).

The C2 orientation, being changed from the C1 orientation, grows in the liquid crystal panel. When the C2 orientation grows, if the growth of the C2 orientation from the C1 orientation is complete over the whole liquid crystal panel surface during the phase transition before reaching room temperature, uniform orientation can be obtained with no zig zag defects. However, if the C1 orientation remains before the C2 orientation completes the growth thereof, zig zag defects occur in an obtained orientation.

In this manner, the growth of the C2 orientation in the smectic C phase with high crystallinity can be considered to be a kind of crystal growth. The direction of the growth agrees to the rubbing direction, which is the uniaxial orientation direction. It is assumed that a conventional problem, i.e., zig zag defects caused by a foreign substance such as a spacer, happens suddenly because of disturbance in the growth of the C2 orientation by the foreign substance.

For the stripe-shaped electrodes, there is a difference in level between an electrode part and an electrode space part, which can be considered a structural foreign substance. Meanwhile, the bed of the orientating films 7 and 8 and the insulating films 4 and 6 are of different materials in the electrode part and in the electrode space part: i.e., ITO (electrode) and glass (glass substrate). ITO and glass have different polarity components and non-polarity components of surface energy. A remarkable difference is that ITO is a conductive material and glass is an insulating material, and therefore ITO and glass generate very different charging conditions on the surface. Hence, it is assumed that a state of the bed affects intermolecular force with the liquid crystal 9 through the orientating films 7 and 8 which are as thin as a few hundreds Å.

We have invented in Japanese Patent Application No. 7-96819/1995 (Tokuganhei 7-96819) a configuration in which gradation display is realized by changing a cell gap in a pixel. In this configuration, thickness of an electrode on one of the two substrates varies in a pixel in a perpendicular direction to a lengthwise direction of the electrode to realize gradation display. Moreover, in this configuration, rubbing treatment is carried out perpendicularly to the direction along which the thickness of the electrode varies, i.e., parallelly to the lengthwise direction of the electrode.

Meanwhile, an electrode on the other substrate facing the electrode having varying thickness is arranged to have a constant thickness. Electrodes on one of the substrates and those on the other are arranged to be perpendicular. Therefore, rubbing treatment is carried out only in a direction to reduce effects of the thick electrodes which are structurally large foreign substance, and not carried out so as to be related with effects by the aforementioned interaction between molecules.

By contrast, for the present liquid crystal display apparatus, the signal electrodes 3 and 5 are of the same thickness and are of the same height on the glass substrates 1 and 2. Therefore, it is apparent that the rubbing treatment is carried out in a direction to reduce effects by the aforementioned interaction between molecules.

Here, since rubbing treatment is carried out in a direction to cross more electrode spaces in the configuration shown in FIG. 2 than in the configuration shown in FIG. 1(*b*), the C2 orientation is better prevented from growing in the configuration shown in FIG. 2. Therefore, in liquid crystal display apparatuses of the same configuration, a uniform C2U orientation can be easily obtained by carrying out rubbing treatment in a direction to cross electrodes having less differences in level.

As mentioned so far, the liquid crystal display apparatus of the present embodiment can produce the uniform C2U orientation having no orientation defects by carrying out rubbing treatment to the orientating film 7 on the substrate having more electrodes in a predetermined range (the signal electrode 3) parallelly to a lengthwise direction of the electrodes. The liquid crystal display apparatus of the present embodiment can thereby realize uniform and high-contrast display.

FIRST VARIATION EXAMPLE

Next, the following description will discuss a first variation example of the present embodiment.

As shown in FIG. 3, the signal electrode 3 of a liquid crystal display apparatus of the present variation example is composed of two divided electrodes (hereinafter, will be referred to as electrodes) 3*a* and 3*b*. The electrode 3*a* is provided to be wider than the electrode 3*b*. One pixel is formed where the electrode 3*a* and the electrode 3*b* cross one of the scanning electrodes 5. Such a configuration can realize gradation display, since voltage is applied to one pixel in four combinations.

Liquid crystal display apparatuses configured in the above manner were made, varying the widths of the scanning electrode 5 and the electrodes 3*a* and 3*b* and the materials for the orientating films 7 and 8 and liquid crystal 9.

When the liquid crystal display apparatuses were made, the width of the scanning electrode 5 was specified to be in a range of 200 to 500 $\mu$m, the width of the electrode 3*a* was specified to be in a range of 100 to 300 $\mu$m, and the width of the electrode 3*b* was specified to be in a range of 50 to 150 $\mu$m, whereas, in any case, the scanning electrode 5 was always specified to be the widest.

$SiO_2$ was used for the insulating films 4 and 6, and the material disclosed in U.S. Pat. No. 5,523,128 was used for the orientating films 7 and 8. Specifically, the orientating films 7 and 8 are composed of a polyimide film formed by condensing mainly 2,2-bis[4-(4-aminophenoxy)phenyl] propane as an amine component and 1,2,4,5-benzenetetracarboxylic dianhydride as a carboxylic acid component. The polyimide film was obtained in the following manner.

First, the above amine and carboxylic components and 1-amino-4-trimethoxysilile benzene were mixed with NMP (N-methyl-2-pyrrolidone) at a mole ratio of 8:7:1.8, then polymerized for 5 hours at 15° C. to obtain an NMP solution containing 10% of polyamid acid. The NMP solution was applied on the insulating films 4 and 6 with a spin coating method, provisionally baked for 5 minutes at 100° C., and then baked for an hour at 200° C. to form the polyimide film of about 500 Å. Alternatively, in the production process of the polyimide film, the baking temperature may be 300° C., and the mole ratio may be 5:4:1.8,4:3:0.9, 60:59:1.8 or 1:1:0.

Rubbing treatment of the orientating films 7 and 8 was carried out parallelly to a lengthwise direction of the signal electrode 3. The ferroelectric liquid crystal SCE-8 made by Merck Ltd. and the ferroelectric liquid crystal composition disclosed in Japanese Laid-Open Patent Application No. 8-101370/1996 (Tokukaihei 8-101370) were used as materials for the liquid crystal 9. The ferroelectric liquid crystal composition is described in an embodiment of Japanese Laid-Open Patent Application No. 8-101370/1996, and obtained, for example, by combining some of seventeen kinds of compounds shown in Table 1 and two kinds of optically active compounds shown in Table 2 in a composition ratio shown in Tables 3 and 4.

TABLE 1

STRUCTURE OF COMPOUNDS

| | | |
|---|---|---|
| Compound 1 | m = 8 | |
| Compound 2 | m = 9 | |
| Compound 3 | m = 10 | $C_mH_{2m+1}O$—⬡—⬡—$OC_8H_{17}$ (with F) |
| Compound 4 | m = 5 n = 8 | |
| Compound 5 | m = 8 n = 5 | |
| Compound 6 | m = 8 n = 8 | $C_mH_{2m+1}O$—⬡—⬡—⬡—$C_nH_{2n+1}$ (with F, F) |
| Compound 7 | m = 7 n = 7 | |
| Compound 8 | m = 7 n = 8 | |
| Compound 9 | m = 7 n = 9 | $C_mH_{2m+1}O$—⬡(N,N)—⬡—$OC_nH_{2n+1}$ |
| Compound 10 | m = 8 n = 8 | |
| Compound 11 | m = 8 n = 10 | |
| Compound 12 | m = 9 n = 6 | |
| Compound 13 | | $C_{10}H_{21}O$—⬡—COO—⬡—$C_8H_{17}$ |
| Compound 14 | | $C_8H_{17}$—⬢—⬡—⬡—$C_8H_{17}$ (with F, F) |
| Compound 15 | | $C_8H_{17}O$—⬡⬡—⬡—$C_8H_{17}$ (with F, F) |
| Compound 16 | | $C_6H_{13}O$—⬡⬡—⬡—$OC_{10}H_{21}$ (with F, F) |
| Compound 17 | | $C_5H_{11}$—⬡—⬡—⬡(N,N)—$C_6H_{13}$ |

TABLE 2

STRUCTURE OF OPTICALLY ACTIVE COMPOUNDS

Compound 18 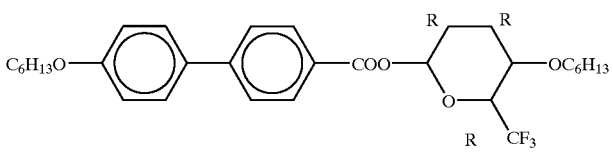

$C_6H_{13}O$—⬡—⬡—COO—(tetrahydropyran with R, R, R, $CF_3$)—$OC_6H_{13}$

TABLE 2-continued

STRUCTURE OF OPTICALLY ACTIVE COMPOUNDS

Compound 19

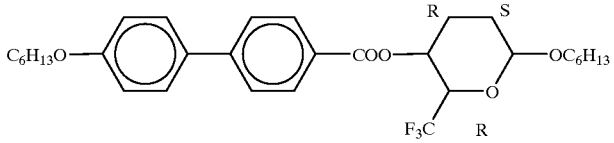

TABLE 3

COMPOUND BREAKDOWN OF COMPOSITIONS 1–10 (PERCENT BY WEIGHT)

| COMPOSITIONS | COMPOUND | | | | | | | | | | | | | |
|---|---|---|---|---|---|---|---|---|---|---|---|---|---|---|
| | 1 | 2 | 3 | 4 | 5 | 6 | 12 | 13 | 14 | 15 | 16 | 17 | 18 | 19 |
| 1 | 16.5 | 16.5 | 16.5 | 16.5 | 16.5 | 16.5 | | | | | | | 0.7 | 0.3 |
| 2 | 14.8 | 14.8 | 14.8 | 14.8 | 14.8 | 14.8 | 10.2 | | | | | | 0.7 | 0.3 |
| 3 | 13.2 | 13.2 | 13.2 | 13.2 | 13.2 | 13.2 | 19.8 | | | | | | 0.7 | 0.3 |
| 4 | 14.8 | 14.8 | 14.8 | 14.8 | 14.8 | 14.8 | | 10.2 | | | | | 0.7 | 0.3 |
| 5 | 13.2 | 13.2 | 13.2 | 13.2 | 13.2 | 13.2 | | 19.8 | | | | | 0.7 | 0.3 |
| 6 | 14.8 | 14.8 | 14.8 | 14.8 | 14.8 | 14.8 | | | 10.2 | | | | 0.7 | 0.3 |
| 7 | 13.2 | 13.2 | 13.2 | 13.2 | 13.2 | 13.2 | | | 19.8 | | | | 0.7 | 0.3 |
| 8 | 13.2 | 13.2 | 13.2 | 13.2 | 13.2 | 13.2 | | | | 19.8 | | | 0.7 | 0.3 |
| 9 | 14.8 | 14.8 | 14.8 | 14.8 | 14.8 | 14.8 | | | | | 10.2 | | 0.7 | 0.3 |
| 10 | 14.8 | 14.8 | 14.8 | 14.8 | 14.8 | 14.8 | | | | | | 10.2 | 0.7 | 0.3 |

TABLE 4

COMPOUND BREAKDOWN OF COMPOSITIONS 11–20 (PERCENT BY WEIGHT)

| COMPOSITIONS | COMPOUND | | | | | | | | | | | | | |
|---|---|---|---|---|---|---|---|---|---|---|---|---|---|---|
| | 4 | 7 | 8 | 9 | 10 | 11 | 12 | 13 | 14 | 15 | 16 | 17 | 18 | 19 |
| 11 | | 5.0 | 9.9 | 14.9 | 19.8 | 29.7 | 19.7 | | | | | | 0.7 | 0.3 |
| 12 | 10.0 | 4.5 | 8.9 | 13.4 | 17.8 | 26.7 | 17.7 | | | | | | 0.7 | 0.3 |
| 13 | 20.0 | 4.0 | 7.9 | 11.9 | 15.8 | 23.7 | 15.7 | | | | | | 0.7 | 0.3 |
| 14 | | 4.5 | 8.9 | 13.4 | 17.8 | 26.7 | 17.7 | 10.0 | | | | | 0.7 | 0.3 |
| 15 | | 4.5 | 8.9 | 13.4 | 17.8 | 26.7 | 17.7 | | 10.0 | | | | 0.7 | 0.3 |
| 16 | | 4.0 | 7.9 | 11.9 | 15.8 | 23.7 | 15.7 | | 20.0 | | | | 0.7 | 0.3 |
| 17 | | 4.0 | 7.9 | 11.9 | 15.8 | 23.7 | 15.7 | | | 20.0 | | | 0.7 | 0.3 |
| 18 | | 4.5 | 8.9 | 13.4 | 17.8 | 26.7 | 17.7 | | | | 10.0 | | 0.7 | 0.3 |
| 19 | | 4.5 | 8.9 | 13.4 | 17.8 | 26.7 | 17.7 | | | | | 10.0 | 0.7 | 0.3 |
| 20 | | 4.0 | 7.9 | 11.9 | 15.8 | 23.7 | 15.7 | | | | | 20.0 | 0.7 | 0.3 |

A uniform C2U orientation was easily obtained over the whole display area of all the liquid crystal display apparatuses made in this manner by adjusting rubbing conditions, such as the number of rotation of a rubbing roller, the moving speed of a stage, a push-in amount of the rubbing roller and the number of times of rubbing.

Here, the rubbing conditions were set as follows (preferred values shown in parentheses):

Number of rotation of the rubbing roller:
  50 to 10000 rpm (200 to 2000 rpm)
Moving speed of the stage:
  5 to 100 mm/sec (10 to 50 mm/sec)
Push-in amount:
  0.1 to 3.0 mm (1.0 to 2.0 mm)
Number of times of rubbing:
  1 to 30 times (3 to 7 times)

A liquid crystal display apparatus was made as a comparative example of this variation example, employing the same configuration except that the rubbing treatment was carried out parallelly to a lengthwise direction of the scanning electrode 5. Despite that the rubbing conditions were adjusted in the above manner, many zig zag defects occurred, and no uniform C2U orientation was obtainable with the liquid crystal display apparatus in most cases.

SECOND VARIATION EXAMPLE

Next, the following description will discuss another variation example of the present embodiment.

Figure 4A:
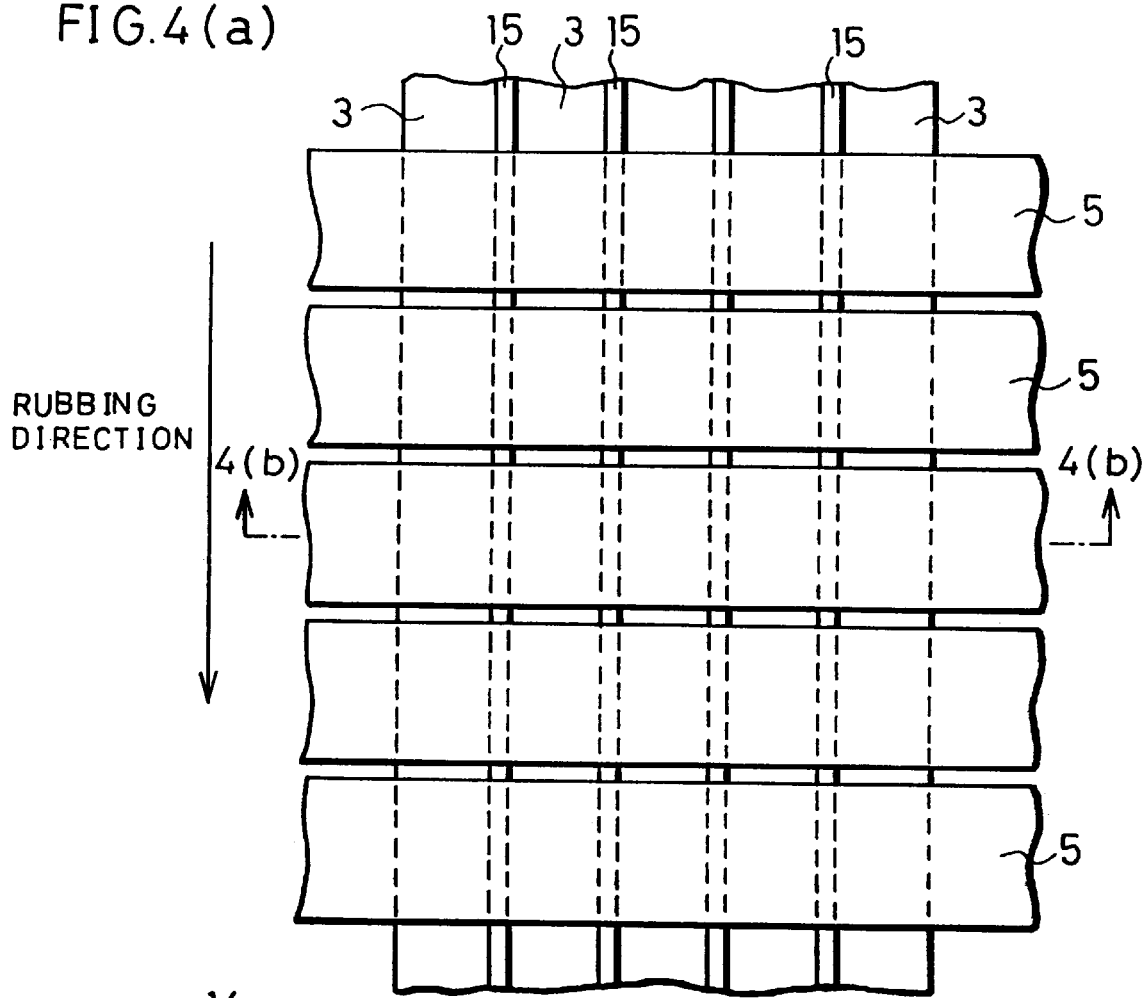
FIG. 4(*a*) is a plain view showing a structure of electrodes of a liquid crystal display apparatus of a second variation example of the first embodiment in accordance with the present invention.
Figure 4B:
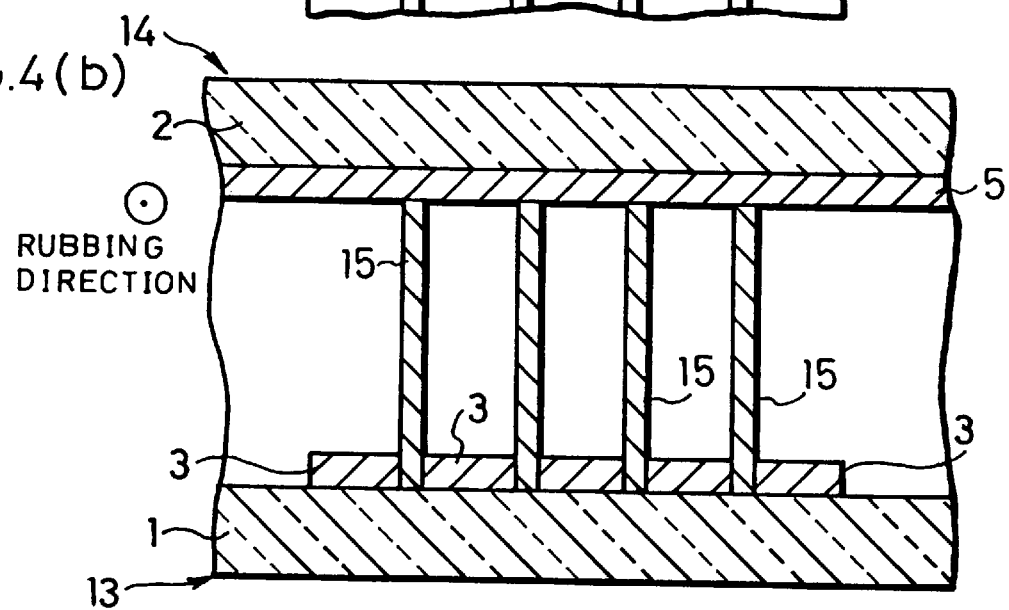

As shown in FIGS. 4(a) and 4(b), a liquid crystal display apparatus of the present variation example incorporates the same electrode structure as that shown in FIG. 1(b) and further includes spacers 15. The spacers 15, composed of photosensitive polyimide, are disposed parallelly to the signal electrodes 3 in respective electrode spaces between signal electrodes 3, i.e., disposed so as to form stripes. The spacer 15 are pasted to the glass substrates 1 and 2 and the scanning electrodes 5, and serve as interval maintaining bodies.

For the present variation example configured in the above manner, rubbing treatment was carried out parallelly to the spacers 15. An uniform C2U orientation was generally easily obtainable with such a variation example by adjusting the rubbing conditions mentioned above.

A liquid crystal display apparatus was made as a comparative example of this variation example, employing a spacer 16 of the same material as the spacer 15 disposed in each electrode space of the scanning electrodes 5 and a rubbing direction carried out parallel to the spacers 16, as shown in FIGS. 5(a) and 5(b). Despite that the rubbing conditions were adjusted, many zig zag defects occurred, and no uniform C2U orientation was obtainable with this liquid crystal display apparatus in most cases.

Note that the insulating films 4 and 6, the orientating films 7 and 8, etc. mentioned above are omitted in FIGS. 4(b) and 5(b) and in FIGS. 6(b) through 8(b) mentioned later.

In the present variation example, the spacers 15 prevents the orientation sate from being disturbed by a mechanical shock, and thus keeps the orientational state.

Japanese Publication for Examined Patent Application No. 2-17007/1990 discloses a configuration where belt-shaped protrusions are disposed parallelly between the stripe-shaped electrodes and rubbing treatment is carried out parallelly to the stripe-shaped electrodes. However, the disclosure, unlike the present embodiment, includes no specification about the relative locations to the two kinds of electrodes which face each other and have the specified widths.

Here, a liquid crystal display apparatus having spacers 15 was made in the same configuration as the liquid crystal display apparatus of the first variation example. When the liquid crystal display apparatus was made, spacers 15 having a thickness of 1.5 $\mu$m were formed in the following manner. First, a photosensitive acrylic resin (Product No. JNPC, made by Japan Synthetic Rubber Co., Ltd.) was processed with a spin coat method to have a thickness of 1.5 $\mu$m, and baked for three minutes at 80° C. Next, the photosensitive acrylic resin was exposed and developed with photomask and then baked for 60 minutes at 200° C.

A uniform C2U orientation was easily obtained over the whole display area of all the liquid crystal display apparatuses made in this manner by adjusting the rubbing conditions. Besides, the orientation was not disturbed when a shock such as a fall or push with a finger was applied to the liquid crystal display apparatuses.

A liquid crystal display apparatus was made as a comparative example of this variation example, employing the same configuration except that the forming direction of the spacers 15 and the rubbing direction was parallel to a lengthwise direction of the scanning electrode 5. This liquid crystal display apparatus exhibited almost the same shock resistant property as the above configuration. Nevertheless, many zig zag defects occurred, and no uniform C2U orientation was obtainable with the liquid crystal display apparatus.

THIRD VARIATION EXAMPLE

Next, the following description will discuss even another variation example of the present embodiment.

Figure 6A:
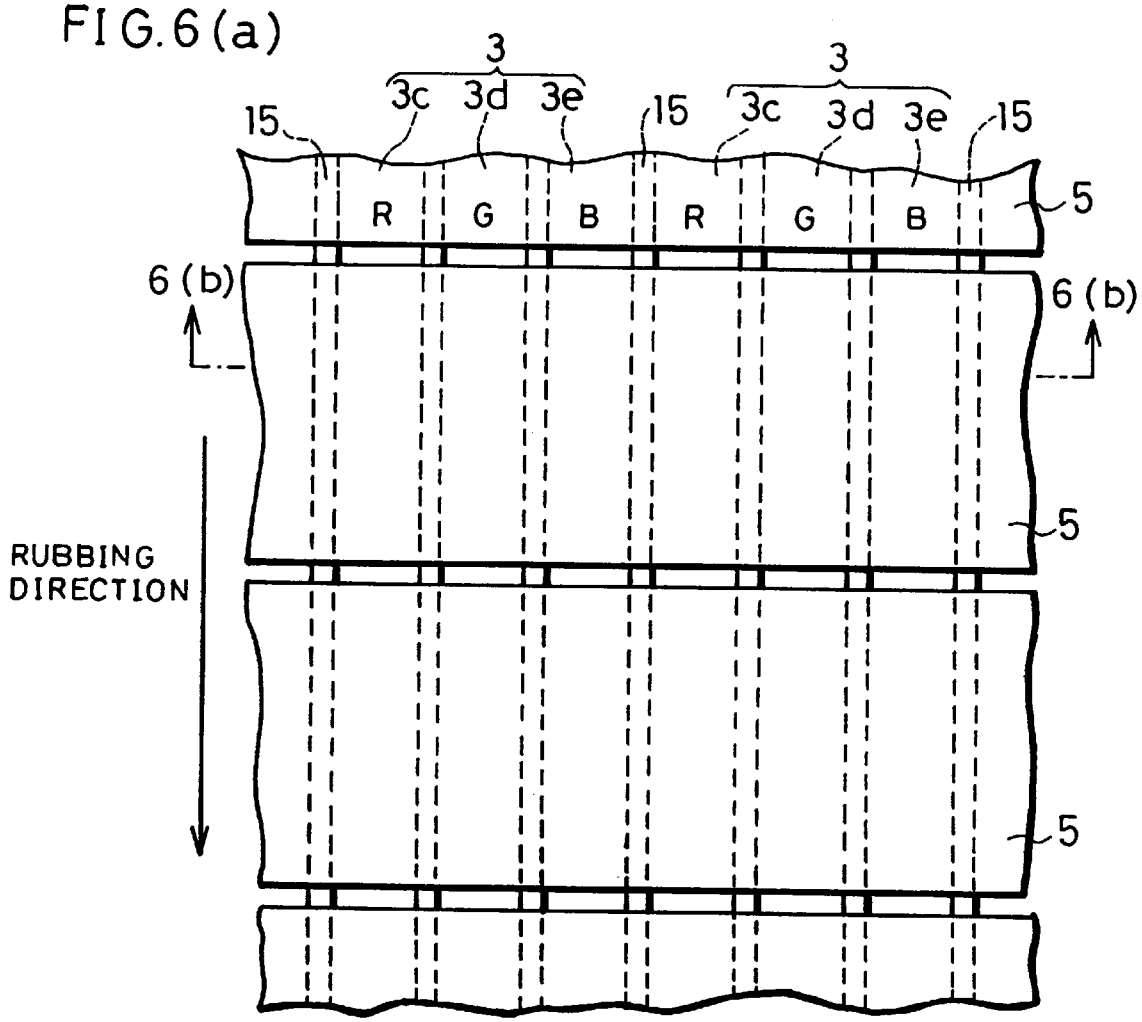
FIG. 6(*a*) is a plain view showing a structure of electrodes of a liquid crystal display apparatus of a third variation example of the first embodiment in accordance with the present invention.
Figure 6B:
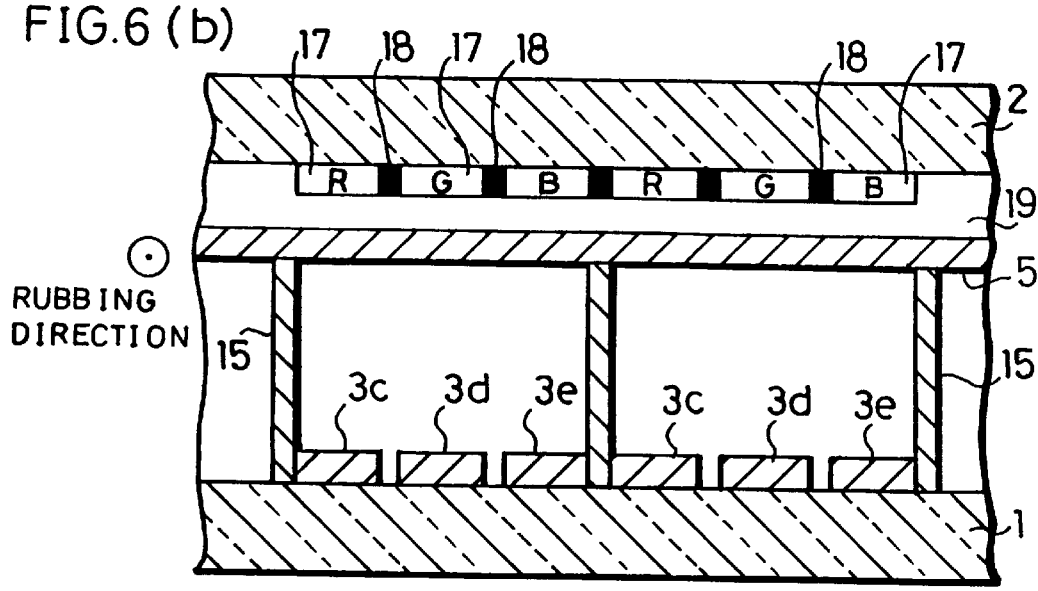

For a liquid crystal display apparatus of the present variation example, micro color filters 17 corresponding to the three primary colors (red, green and blue) are provided on a glass substrate 2 for every pixel as shown in FIGS. 6(a) and 6(b). Light blocking members (black matrixes) 18 are provided between neighboring micro color filters 17. The micro color filters 17 are covered with an overcoating layer 19, and scanning electrodes 5 are formed on the overcoating layer 19.

The signal electrode 3 formed on the glass substrate 1 is composed of three divided electrodes (hereinafter, will be referred to as electrodes) 3c, 3d and 3e corresponding to the respective red, green and blue micro color filters 17 for one pixel. A spacer 15 is disposed in an electrode space for every pixel. Alternatively, a spacer 15 may be disposed for every plurality of pixels.

For a simple-matrix color liquid crystal display apparatus, since an overcoating layer is generally made of an organic material such as acrylic or polyimide, it is difficult to form a precise ITO transparent electrode on the overcoating layer with an etching method and the like. This is because the adhesive property of ITO with the organic material is inferior to that of ITO with the glass substrate. Therefore, in the above configuration, wide scanning electrodes 5 formed on the overcoating layer 19 can reduce effects of the organic material.

Figure 7A:
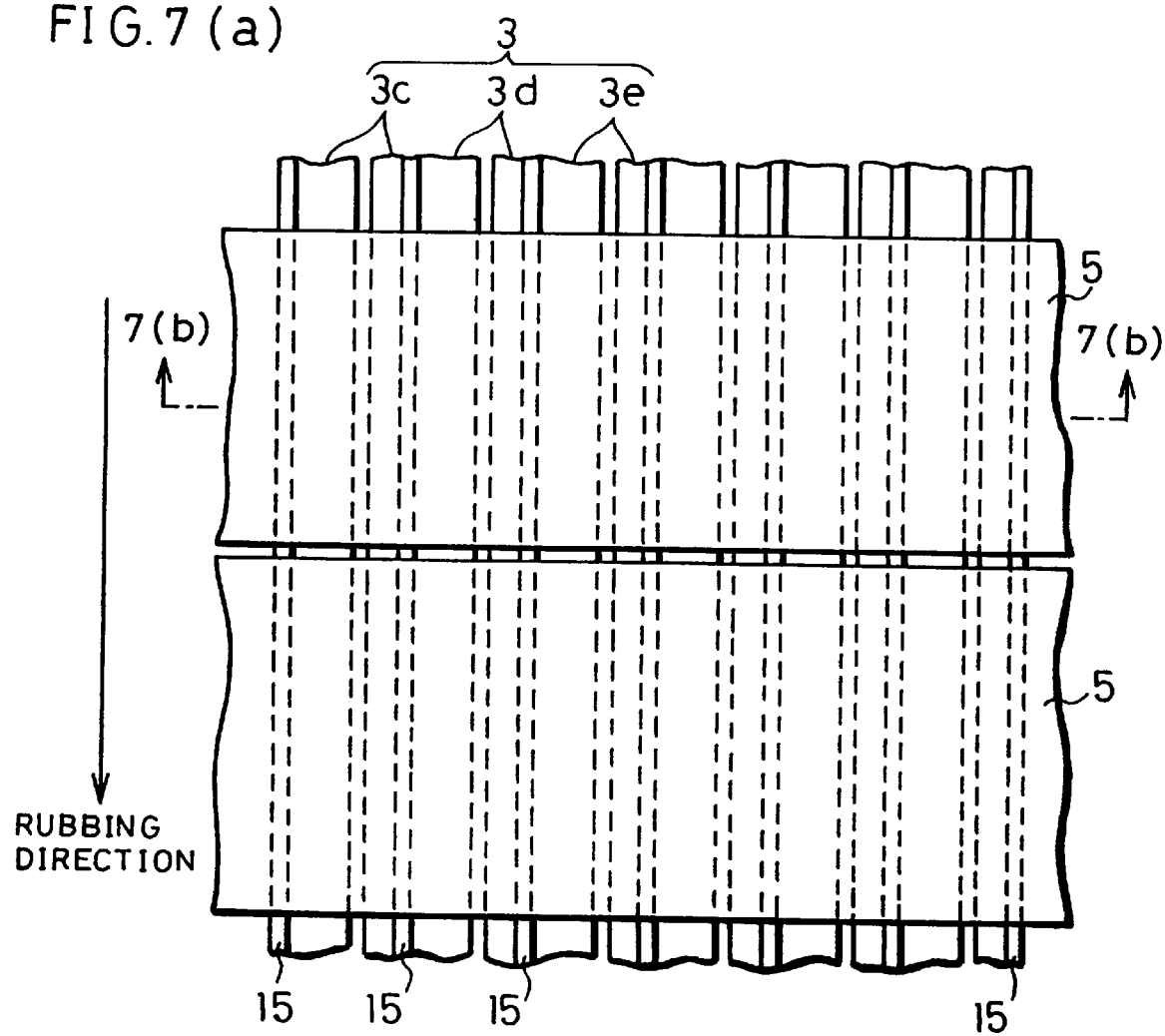
FIG. 7(*a*) is a plain view showing a structure of electrodes of another liquid crystal display apparatus of a third variation example of the first embodiment in accordance with the present invention.
Figure 7B:
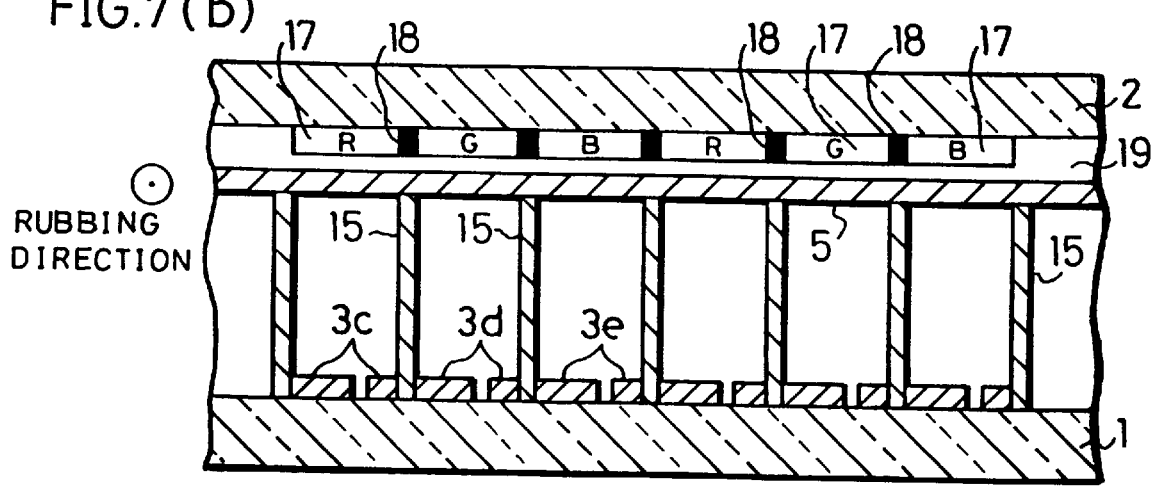

Moreover, in the above configuration, the signal electrode 3 may be composed of two electrodes 3c, two electrodes 3d and two electrodes 3e as shown in FIGS. 7(a) and 7(b) to realize space dividing gradation display. In this configuration, the spacer 15 is provided in every electrode space for each red, green and blue color. Alternatively, a spacer 15 may be provided for each pixel as shown in FIGS. 8(a) and 8(b).

An increase in the number of the spacers 15 is preferable to improve the shock resistant property as in the configuration shown in FIGS. 7(a) and 7(b). Nevertheless, it takes a longer time to inject liquid crystal with a narrower interval between neighboring spacers 15, and in some cases, liquid crystal might not be injected into all the pixels. These problems are solved by expanding the interval between the neighboring spacers 15 to some extent as the configuration shown in FIGS. 8(a) and 8(b). In order to smoothly conduct the injection, the interval between the neighboring spacers 15 needs to be not narrower than 10 $\mu$m, and preferably not narrower than 100 $\mu$m.

The interval between the neighboring spacers 15 is determined, considering the shock resistant property and the injection process of liquid crystal. However, for the liquid crystal display apparatus of the present variation example, it is preferable to provide a spacer 15 for every pixel or a plurality of pixels with an electrode functioning as one pixel as the smallest unit, regardless of whether a color filter or a pixel is divided.

In a structure where one pixel or a plurality of pixels are divided by the spacers 15 with one pixel as the smallest unit, effects of, for example, a switching threshold value by the spacers 15 can be assumed to be constant inside the pixel. On the contrary, in a configuration where one pixel is divided by the spacers 15, characteristics might vary slightly inside the pixel, which affects, for example, color display and gradation display.

Here, liquid crystal display apparatuses incorporating the configuration shown in FIGS. 8(a) and 8(b) were made. When the liquid crystal display apparatuses were made, the spacers 15 were made in the same manner as in the first variation example. The same material as in the first variation example was used for liquid crystal, etc.

A uniform C2U orientation was easily obtained over the whole display area of all the liquid crystal display apparatuses made in this manner. Besides, the orientation was not disturbed when a shock was applied to the liquid crystal display apparatuses. Moreover, when liquid crystal material was injected, an enough amount of liquid crystal was injected in all the pixels.

A liquid crystal display apparatus was made in the same configuration as the liquid crystal display apparatus shown in FIGS. 8(a) and 8(b), except that each electrode space with respect to the signal electrodes 3 is provided with a spacer 15 as shown in FIG. 9. In this liquid crystal display apparatuses, when liquid crystal material is injected, the liquid crystal was not injected into all the pixels.

In addition, a liquid crystal display apparatus which has divided scanning electrodes 5 and which is provided with spacers 15 was made, using a liquid crystal display apparatus of the second embodiment mentioned later. Almost the same results as the liquid crystal display apparatus of the present variation example were obtained.

SECOND EMBODIMENT

Referring to FIGS. 10 through 14, the following description will discuss a second embodiment of the present invention. Here, for convenience, members of the present embodiment that have the same arrangement and function as members of the first embodiment, and that are mentioned in the first embodiment are indicated by the same reference numerals and description thereof is omitted.

As shown in FIG. 10(a), a liquid crystal display apparatus of the present embodiment incorporates the same configuration as the first embodiment, except for the electrode structure. The present liquid crystal display apparatus has signal electrodes 21 provided on a glass substrate 1 so as to form stripes and scanning electrodes 22 provided on a glass substrate 2 so as to form stripes. The signal electrodes 21 and the scanning electrodes 22 are disposed so as to cross.

As shown in FIG. 10(b), pixels of the present liquid crystal display apparatus is formed where the signal electrodes 21 and the scanning electrodes 22 cross. The scanning electrodes 22 are formed in the same width $D_3$, while the signal electrodes 21 are formed in decreasing width from the left side to the right side in FIG. 10(b). The signal electrodes 21 has the widest width of $D_4$ and the narrowest width of $D_5$. The width $D_3$ is specified to be $D_5<D_3<D_4$.

The signal electrodes 21 and the scanning electrodes 22 are formed in the same thickness. Intervals between neighboring signal electrodes 21 and those between neighboring scanning electrodes 22 are all specified to be equal.

The number of the signal electrodes 21 and the scanning electrodes 22 are specified so that the number of pixels on a signal electrode 21 and the number of pixels on a scanning electrode 22 are equal in the present liquid crystal display apparatus. Therefore, there are an equal number of signal electrodes 21 and scanning electrodes 22 in a configuration in which a pixel is formed where one of the signal electrodes 21 and one of the scanning electrodes 22 cross. Therefore, there are also an equal number of signal electrodes 21 and scanning electrodes 22 in a configuration in which the signal electrode 21 and the scanning electrode 22 forming one pixel are divided into an equal number like a liquid crystal display apparatus of a variation example mentioned later.

As to the electrode substrate 13', the orientating film 7 receives rubbing treatment parallelly or almost parallelly to a lengthwise direction of the signal electrodes 21. As to the electrode substrate 14', the orientating film 8 receives rubbing treatment perpendicularly or almost perpendicularly to a lengthwise direction of the scanning electrodes 22. The electrode substrates 13' and 14' are combined so that the directions of the rubbing treatment of the orientating films 7 and 8 become parallel to each other.

In the present liquid crystal display apparatus, the electrode substrate having the narrowest electrode receives rubbing treatment parallelly (almost parallelly) to a lengthwise direction thereof. Therefore, if the scanning electrodes 22 include the narrowest electrodes, the rubbing treatment of the orientating films 7 and 8 are conducted in the opposite direction to that in the above case.

For the present liquid crystal display apparatus configured in the above manner, conducting the rubbing treatment along the signal electrode 21 results in a growth of a smectic layer in a direction with less differences in level caused by the electrodes on the substrates. This reduces effects of the differences in level where defects are more likely to occur, and the C2U orientation can be obtained over the whole surfaces of the electrode substrates 13' and 14'.

Figure 11:
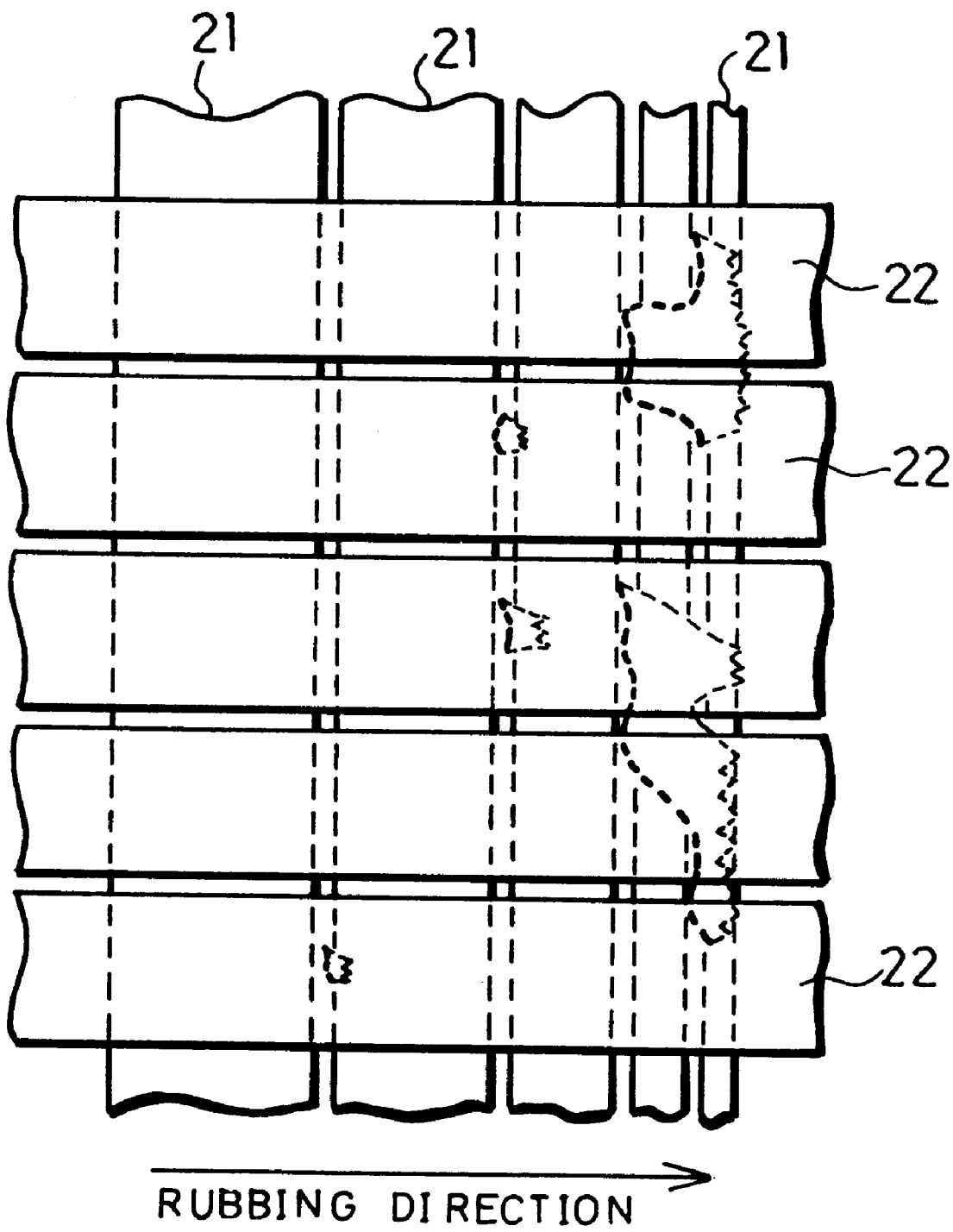
FIG. 11 is a plain view showing a relation between a structure of electrodes and zig zag defects of a liquid crystal display apparatus whose rubbing direction is different from that of the liquid crystal display apparatus shown in FIG. 10(*a*).

On the other hand, if the direction of the rubbing treatment is parallel to a lengthwise direction of the scanning electrodes 22, since the C2U and C1T orientations coexist in mixture, zig zag defects occur between neighboring signal electrodes 21 and extend in the rubbing direction as shown in FIG. 11. More zig zag defects occur in a region where the electrode is narrow than anywhere else.

Such non-uniformity in the orientational state caused by the rubbing direction can be explained from observation with a microscope as below.

In a growth process of the C2 orientation, even if the growth of the C2 orientation is hindered by a difference in level or an electrode space, the C2 orientation continues to grow in a neighboring electrode part. Therefore, if the electrode is wide in the growth direction, the zig zag defects are surrounded by the C2 orientation growing out of the electrode part and disappear. In contrast, if the electrode is narrow in the growth direction, the growth of the C2 orientation is hindered by a next difference in level or electrode space before the zig zag defects are surrounded by the C2 orientation growing out of the electrode part.

Therefore, for a liquid crystal display apparatus, it is preferable to determine the rubbing direction so that the C2 orientation is not hindered with respect to a narrow electrode.

FIRST VARIATION EXAMPLE

Next, the following description will discuss a variation example of the present embodiment.

Figure 12:
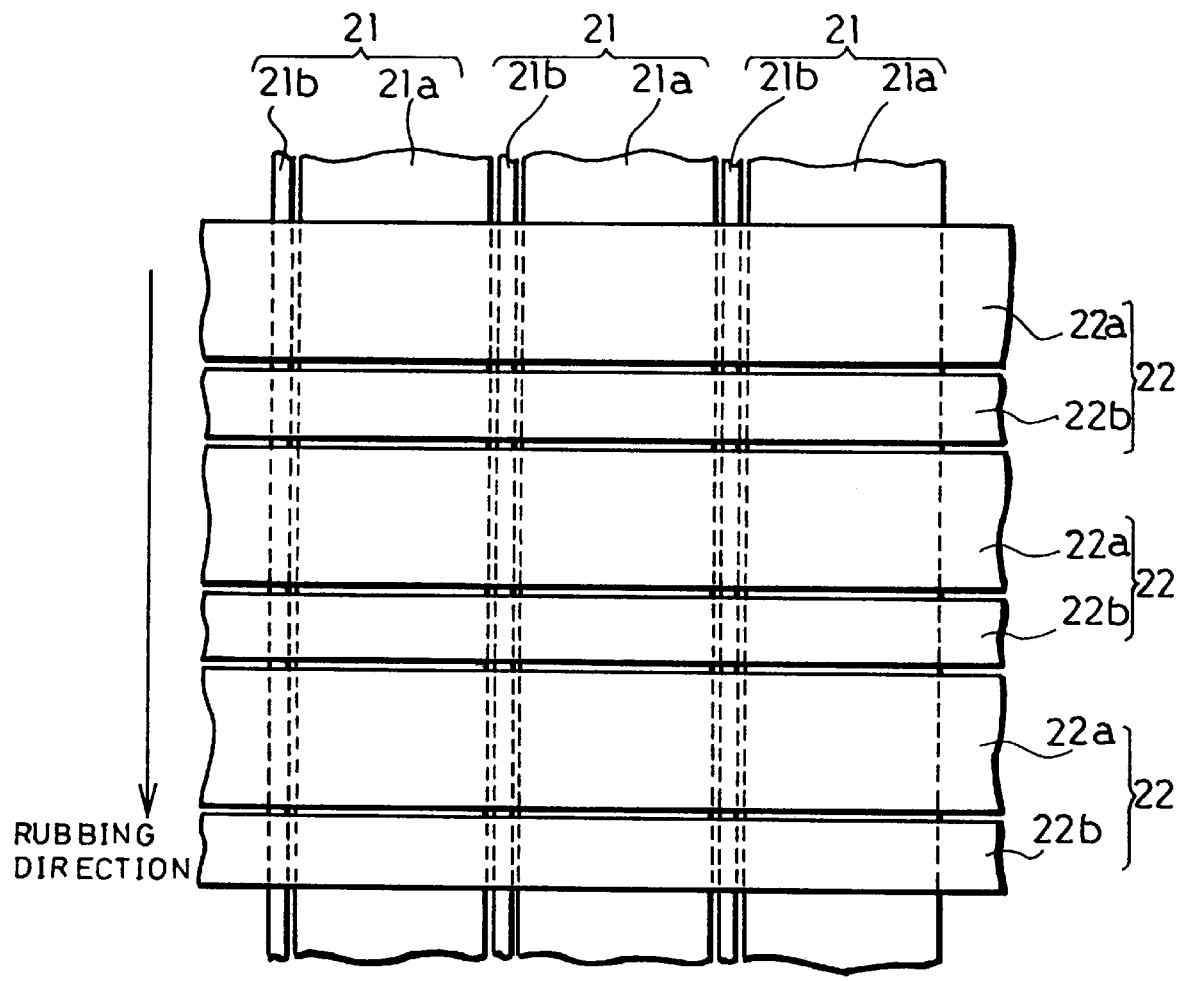
FIG. 12 is a plain view showing a structure of electrodes of a liquid crystal display apparatus of a first variation example of the second embodiment in accordance with the present invention.

As shown in FIG. 12, for a liquid crystal display apparatus of the present variation example, the signal electrode 21 is divided into two electrodes 21a and 21b, and the scanning electrode 22 is divided into two electrodes 22a and 22b. The electrode 21a is formed to be wider than the electrode 21b, and the electrode 22a is formed to be wider than the electrode 22b. Besides, the electrodes 21a and 21b are the widest and narrowest, respectively, of all the electrodes. A pixel is formed where either the electrode 21a or 21b crosses either the electrode 22a or 22b. Such a configuration can realize gradation display, since voltage is applied to one pixel in sixteen combinations.

Liquid crystal display apparatuses configured in the above manner were made, varying the widths of the electrodes 21a, 21b, 22a and 22b and the materials for the orientating films 7 and 8 and liquid crystal 9.

When the liquid crystal display apparatuses were made, the widths of the electrodes 21a and 21b were specified to be in ranges of 300 to 500 $\mu$m and 50 to 100 $\mu$m respectively, and the widths of the electrodes 22a and 22b were specified to be in ranges of 200 to 400 $\mu$m and 100 to 200 $\mu$m respectively, whereas, in any case, the widths of the electrodes were always specified to be in the aforementioned sequence.

SiO$_2$ was used for insulating films 4 and 6, and the material disclosed in U.S. Pat. No. 5,523,128 was used for the orientating films 7 and 8. Rubbing treatment of the orientating films 7 and 8 was carried out parallelly to a lengthwise direction of the signal electrode 21. The ferroelectric liquid crystal SCE-8 made by Merck Ltd. and the ferroelectric liquid crystal composition disclosed in Japanese Laid-Open Patent Application No. 8-101370/1996 were used as materials for the liquid crystal 9.

A uniform C2U orientation was easily obtained with all the liquid crystal display apparatuses made in this manner by adjusting rubbing conditions, such as the number of rotation of a rubbing roller, the moving speed of a stage, a push-in amount of the rubbing roller and the number of times of rubbing.

A liquid crystal display apparatus was made as a comparative example of this variation example, employing the same configuration except that the rubbing treatment was carried out parallelly to a lengthwise direction of the scanning electrode 22. Despite that the rubbing conditions were adjusted in the above manner, many zig zag defects occurred, and no uniform C2U orientation was obtainable with the liquid crystal display apparatus in most cases.

As mentioned above, for the liquid crystal display apparatus of the present embodiment, the uniform C2U orientation with no orientational defects can be obtained by carrying out the rubbing treatment to the orientating film 7 on the side of the narrowest electrode (signal electrode 21) parallelly to a lengthwise direction of that electrode. Therefore, the present liquid crystal display apparatus can realize uniform and high-contrast display.

When the present liquid crystal display apparatus is to incorporate spacers and color filters, such a liquid crystal display apparatus has a cross-sectional view along the scanning electrode 22, which is similar to a structure shown in FIG. 7(*b*) or 8(*b*).

SECOND VARIATION EXAMPLE

Next, the following description will discuss another variation example of the present embodiment.

Figure 10:
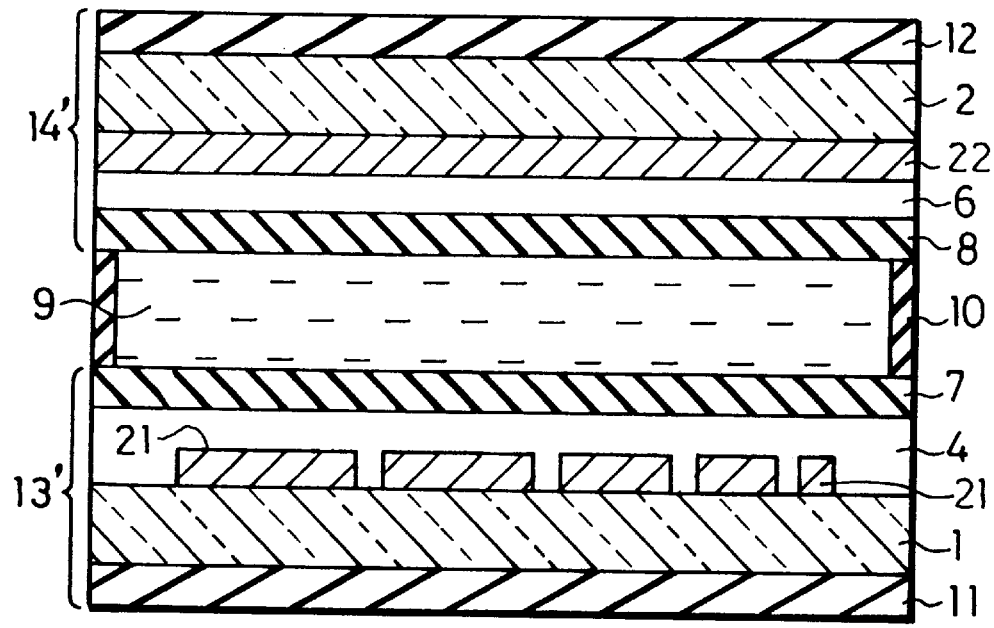
FIG. 10(*a*) is a cross-section al view showing a structure of a main part of a liquid crystal display apparatus of a second embodiment in accordance with the present invention.
Figure 10:
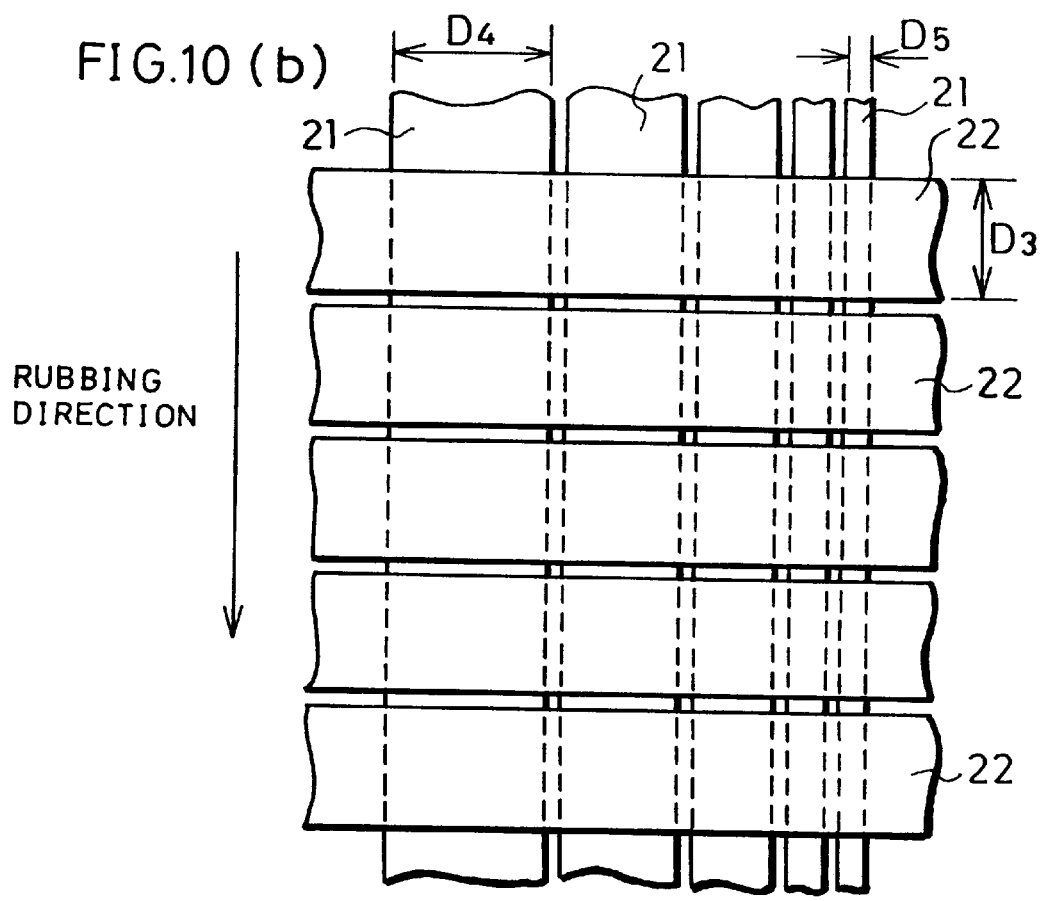
Figure 13A:
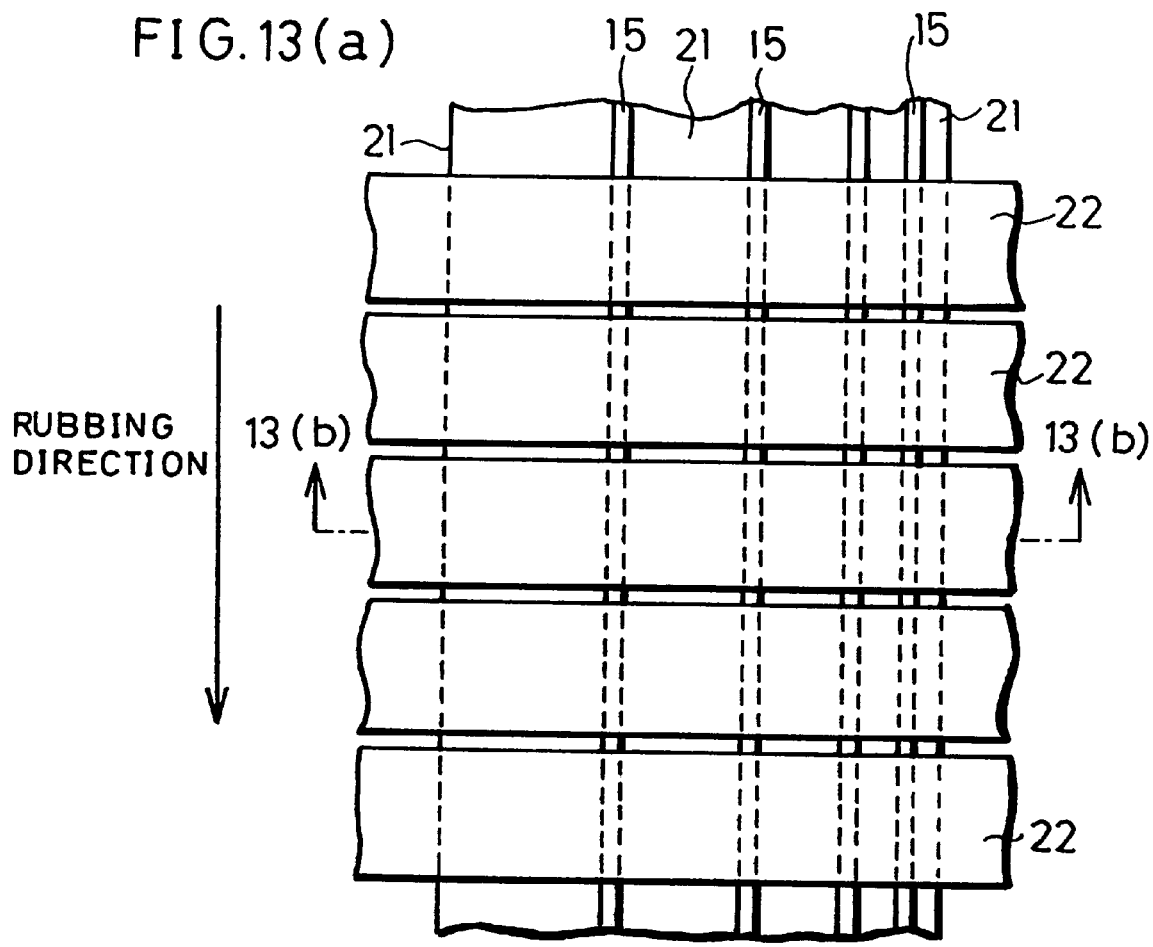
FIG. 13(*a*) is a plain view showing a structure of electrodes of a liquid crystal display apparatus of a second variation example of the second embodiment in accordance with the present invention.
Figure 13B:
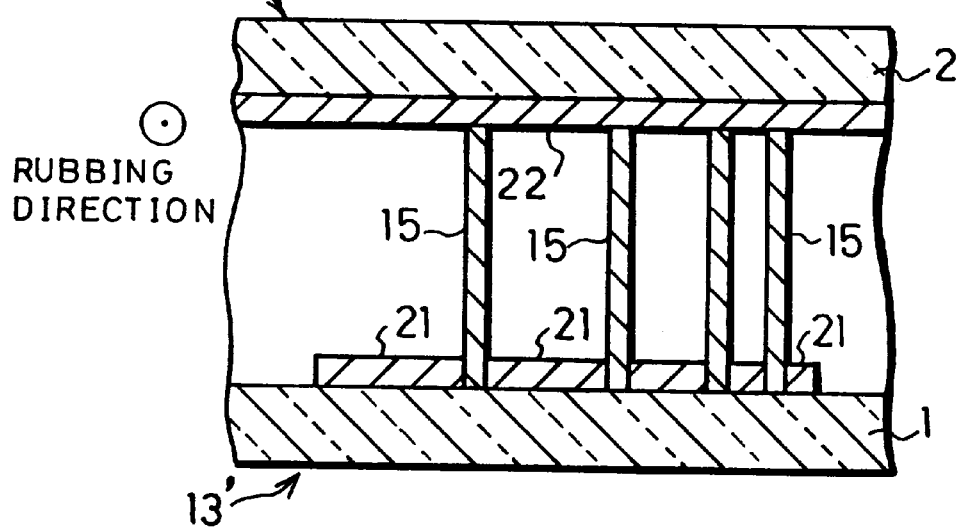

As shown in FIGS. 13(*a*) and 13(*b*), a liquid crystal display apparatus of the present variation example incorporates the same electrode structure as that shown in FIG. 10(*b*) and further includes spacers 15. The spacers 15 are disposed parallelly to the signal electrodes 21 in respective electrode spaces between signal electrodes 21, i.e., disposed so as to form stripes, as in the configuration of the second variation example of the first example.

In the present variation example configured in the above manner, rubbing treatment is carried out parallelly to the spacers 15. With such a variation example, a uniform C2U orientation was generally easily obtainable by adjusting the above rubbing conditions.

Figure 14B:
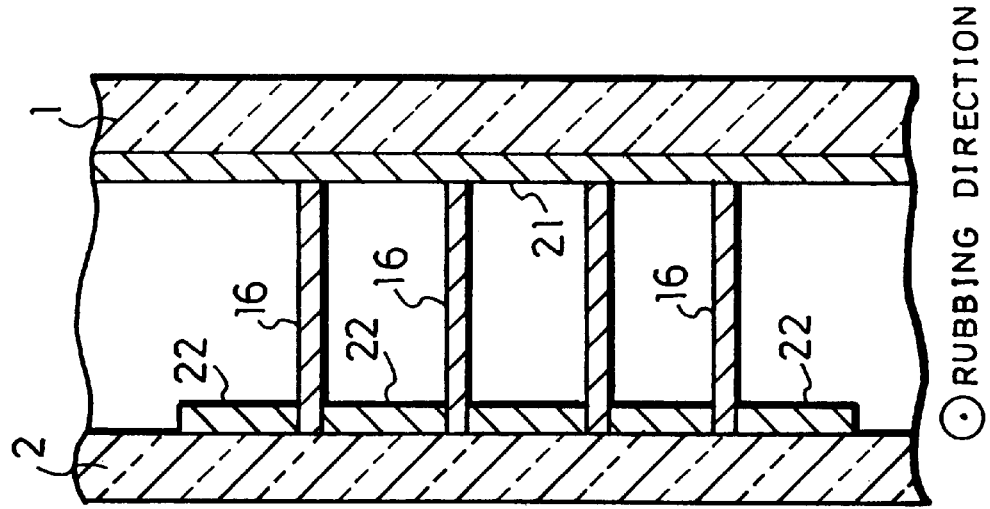
FIG. 14(*a*) is a plain view showing a structure of electrodes of a liquid crystal display apparatus whose rubbing direction is different from that of the liquid crystal display apparatus shown in FIG. 13(*a*).
Figure 14A:
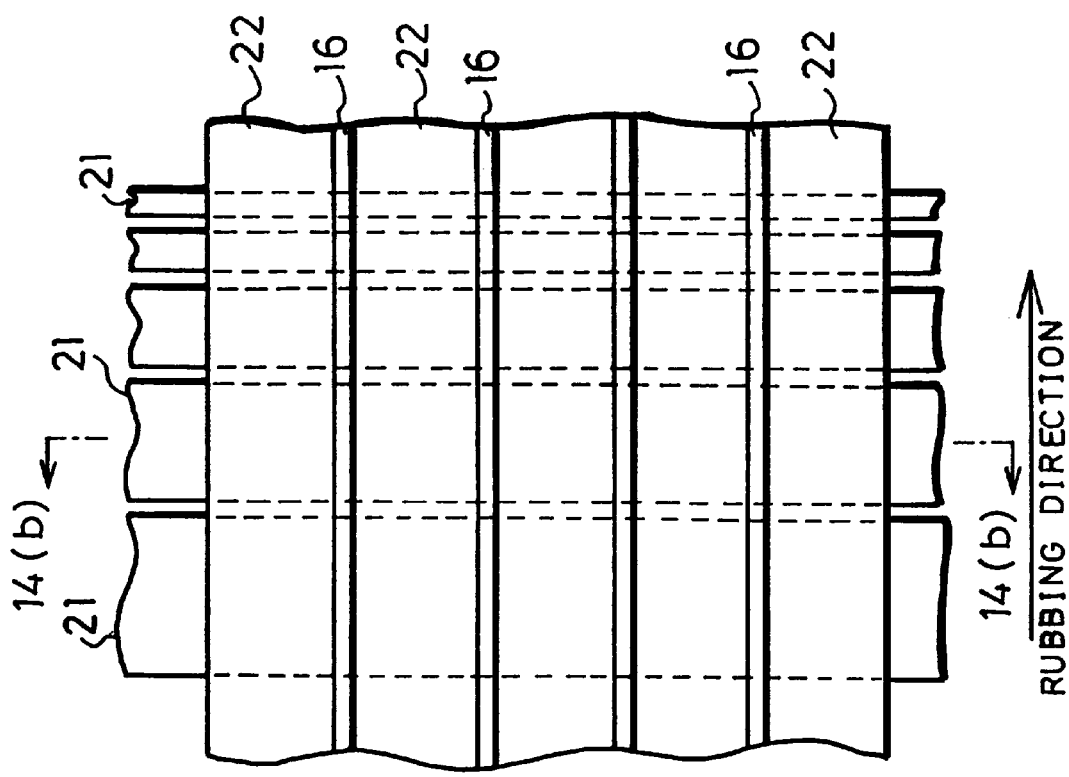

As shown in FIGS. 14(*a*) and 14(*b*), a liquid crystal display apparatus was made as a comparative example of this variation example, employing spacers 16 disposed in the electrode spaces between the scanning electrode 22 and the rubbing treatment carried out parallelly to the spacers 16. Despite that the rubbing conditions were adjusted, many zig zag defects occurred, and no uniform C2U orientation was obtainable with the liquid crystal display apparatus in most cases.

Note that the insulating films 4 and 6, the orientating films 7 and 8, etc. mentioned above are omitted in FIGS. 13(*b*) and 14(*b*).

In the present variation example, the spacers 15 prevents the orientational state from being disturbed by a mechanical shock.

Here, a liquid crystal display apparatus having spacers 15 was made in the same configuration as the liquid crystal display apparatus of the first variation example. When the liquid crystal display apparatus was made, spacers 15 having a thickness of 1.5 μm were formed in the same manner as in the second variation example of the first embodiment. The liquid crystal display apparatus was tested for shock resistance in the same manner.

A uniform C2U orientation was easily obtained over the whole display area of all the liquid crystal display apparatuses made in this manner by adjusting the rubbing conditions. Besides, the orientation was not disturbed when a shock was applied to the liquid crystal display apparatuses.

A liquid crystal display apparatus was made as a comparative example of this variation example, employing the same configuration except that the forming direction of the spacers 16 and the rubbing direction were parallel to a lengthwise direction of the scanning electrode 22. This liquid crystal display apparatus exhibited almost the same shock resistant property as the above configuration. Nevertheless, many zig zag defects occurred, and no uniform C2U orientation was obtainable with the liquid crystal display apparatus.

THIRD EMBODIMENT

Referring to FIGS. 15 through 19, the following description will discuss a third embodiment in accordance with the present invention. Here, for convenience, members of the present embodiment that have the same arrangement and function as members of the first embodiment, and that are mentioned in the first embodiment are indicated by the same reference numerals and description thereof is omitted.

Figure 15:
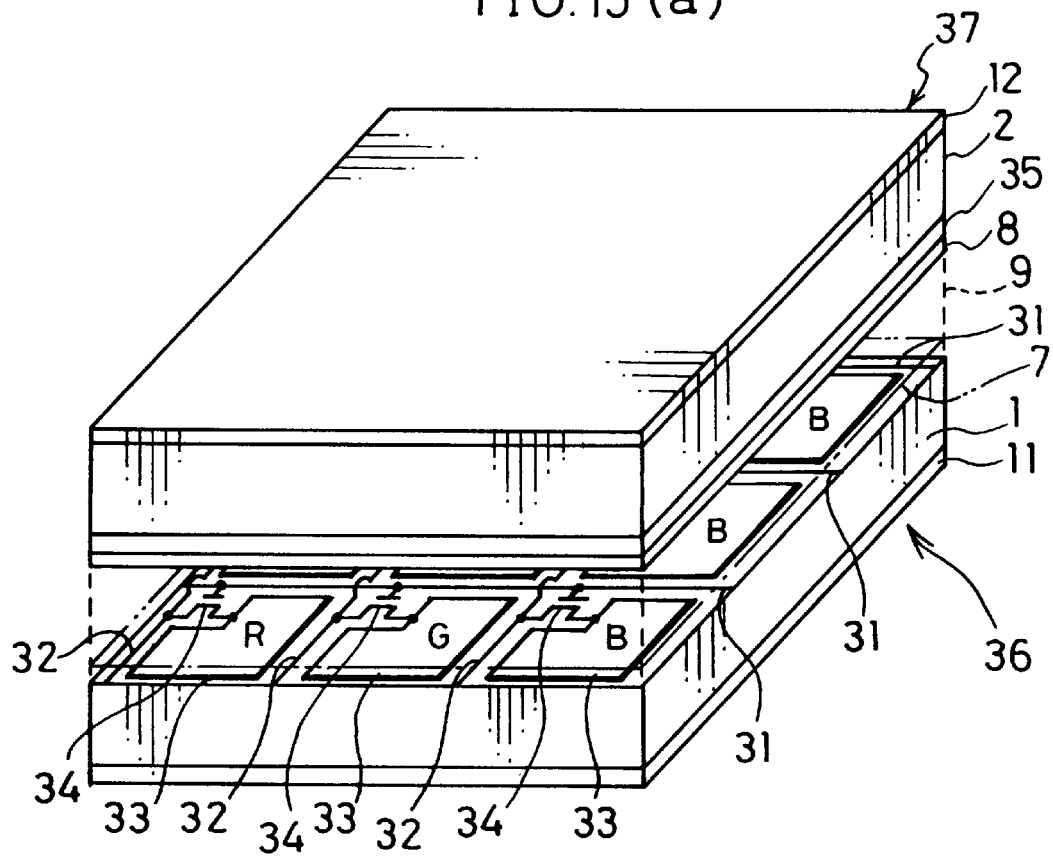
FIG. 15(*a*) is a perspective view showing a structure of a main part of a liquid crystal display apparatus of a third embodiment in accordance with the present invention.
Figure 15:
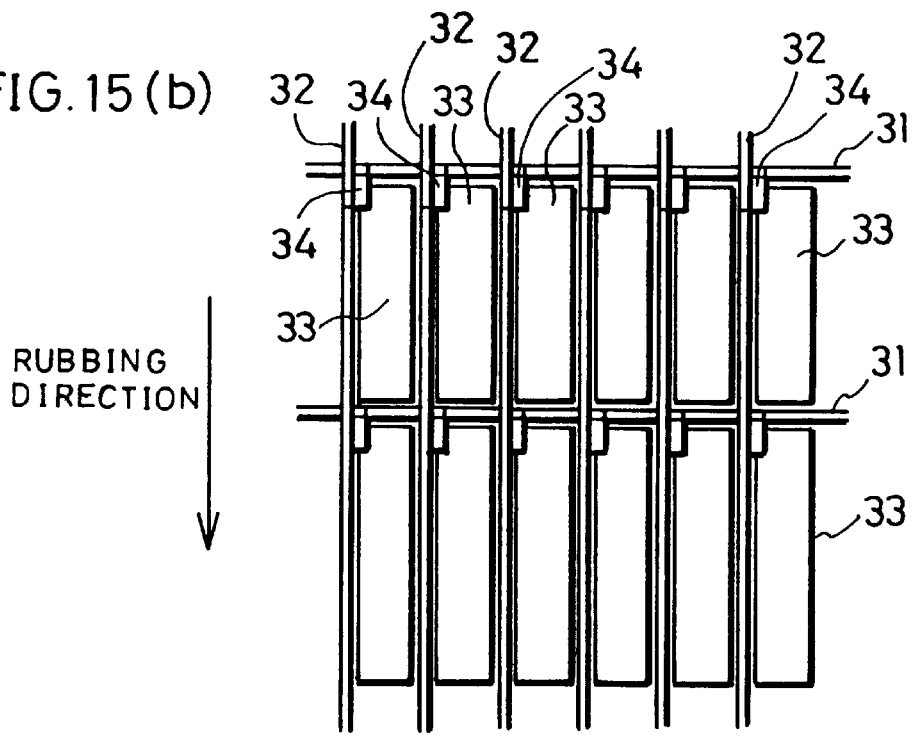

A liquid crystal display apparatus of the present embodiment includes two glass substrates 1 and 2 facing each other as shown in FIG. 15(*a*).

On the surface of the glass substrate 1, gate lines 31 composed of, for example, Al are provided parallelly to each other. On the gate lines 31 via an insulating film (not shown), source lines 32 composed of, for example, Al are provided parallelly to each other. The gate lines 31 and the source lines 32 are disposed so as to cross each other. A pixel electrode 33 is disposed in an area surrounded by neighboring gate lines 31 and neighboring source lines 32. The pixel electrodes 33 are arranged to form a matrix over the whole glass substrate 1.

The pixel electrodes 33 are so arranged that three neighboring pixels realize display for one pixel: one for red, one for green and one for blue. As shown in FIG. 15(*b*), since a pixel has a square-like shape, each pixel electrode 33 is a rectangle positioned with the lengthwise direction thereof along the source line 32. The width and length of the pixel electrode 33 are formed to be parallel to the gate line 31 and source line 32 respectively.

A thin film transistor (TFT) 34 is provided in a neighborhood of each crossing point of the gate lines 31 and source lines 32. The thin film transistor 34 is connected at a gate thereof to the gate line 31, at a source thereof to the source line 32 and at a drain thereof to the pixel electrode 33.

The gate line 31, source line 32, pixel electrode 33 and thin film transistor 34 are covered with a transparent insulating film (not shown) and an orientating film 7. A polarizing plate 11 is provided on an opposite side of the glass substrate 1 to a side thereof on which the gate lines 31 are provided.

Meanwhile, common electrodes 35 is provided on a surface of the glass substrate 2 and is covered with an orientating film 8. A polarizing plate 12 is provided on an opposite side of the glass substrate 2 to a side thereof on which the common electrodes 35, etc. are provided.

An electrode substrate 36 is composed of the glass substrate 1, gate line 31 and the like in the above manner. Meanwhile, an electrode substrate 37 is composed of the glass substrate 2, common electrodes 35 and the like. In addition, liquid crystal (ferroelectric liquid crystal) 9 fills a space formed between the electrode substrates 36 and 37 combined with a sealing agent (not shown).

As to the electrode substrate 36, the orientating film 7 receives rubbing treatment parallelly or almost parallelly to a lengthwise direction of the pixel electrode 33 as shown in FIG. 15(b). As to the electrode substrate 37, the orientating film 8 receives rubbing treatment in one direction. The electrode substrates 36 and 37 are combined so that the directions of the rubbing treatment of orientating films 7 and 8 become parallel to each other.

For the present liquid crystal display apparatus configured in the above manner, conducting the rubbing treatment along a lengthwise direction of the pixel electrode 33 results in a growth of a smectic layer in a direction with less differences in level caused by the electrodes on the substrates. This reduces effects of the differences in level where defects are more likely to occur, and a C2U orientation can be obtained over the whole surface.

Figure 16:
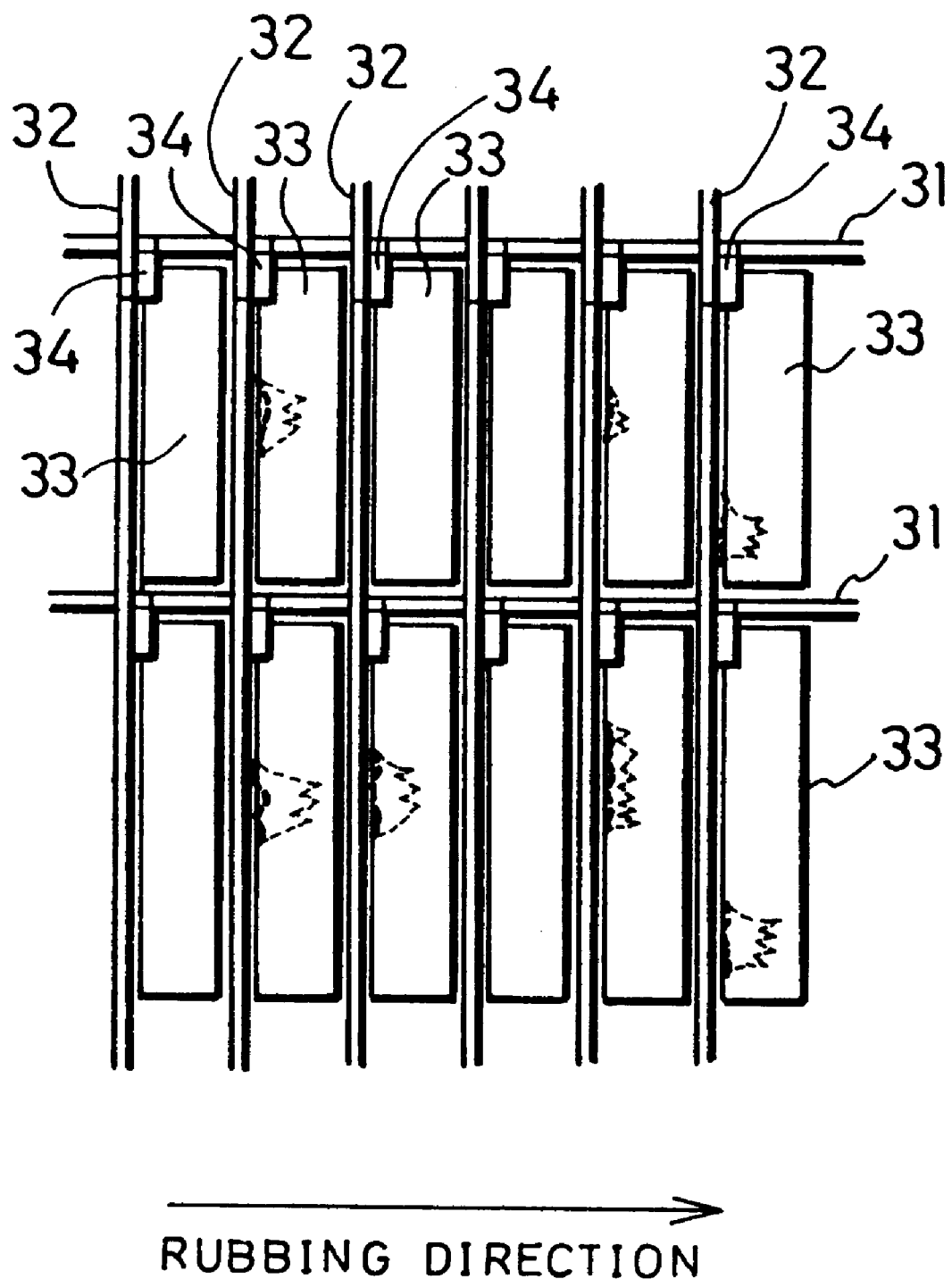
FIG. 16 is a plain view showing a relation between a structure of electrodes and zig zag defects of a liquid crystal display apparatus whose rubbing direction is different from that of the liquid crystal display apparatus shown in FIG. 15(*a*).
Figure 17:
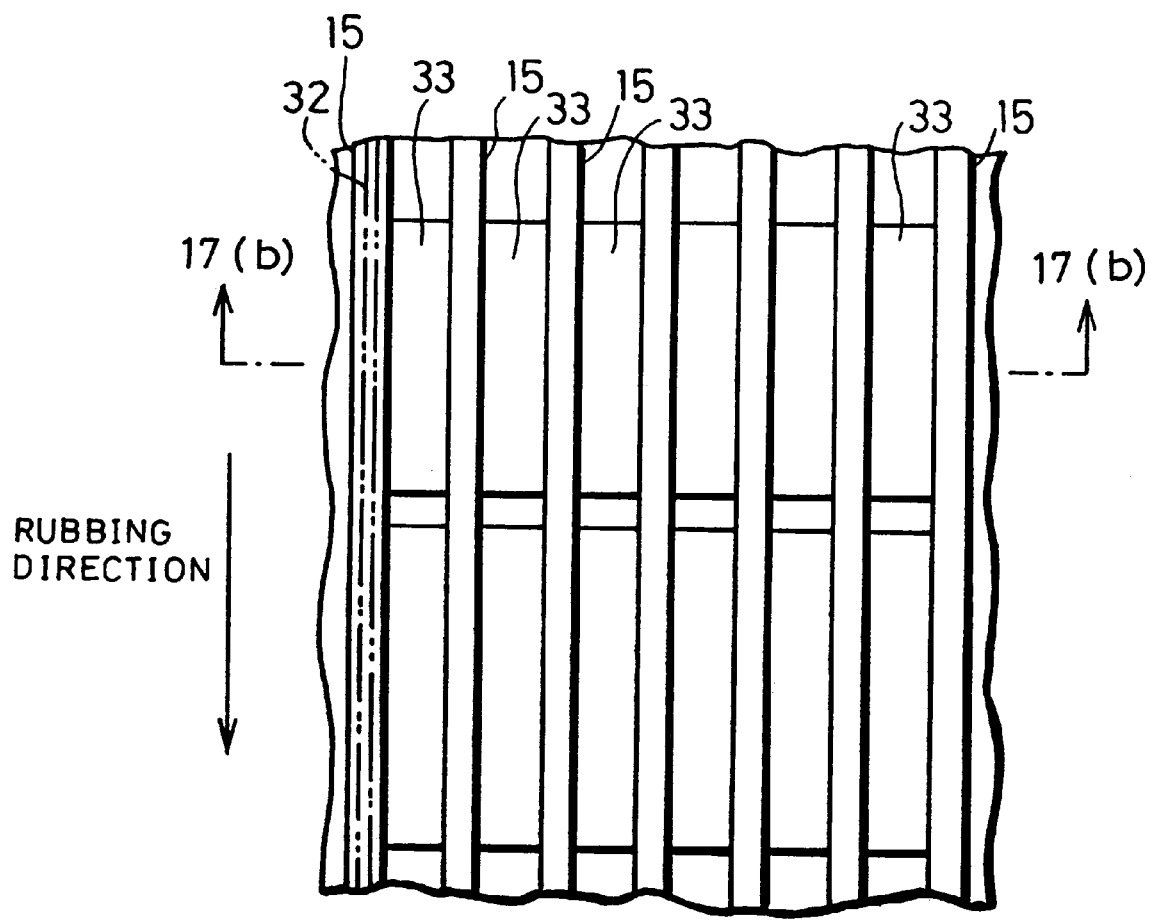
FIG. 17(*a*) is a plain view showing a structure of electrodes of a liquid crystal display apparatus of a first variation example of the third embodiment in accordance with the present invention.
Figure 17:
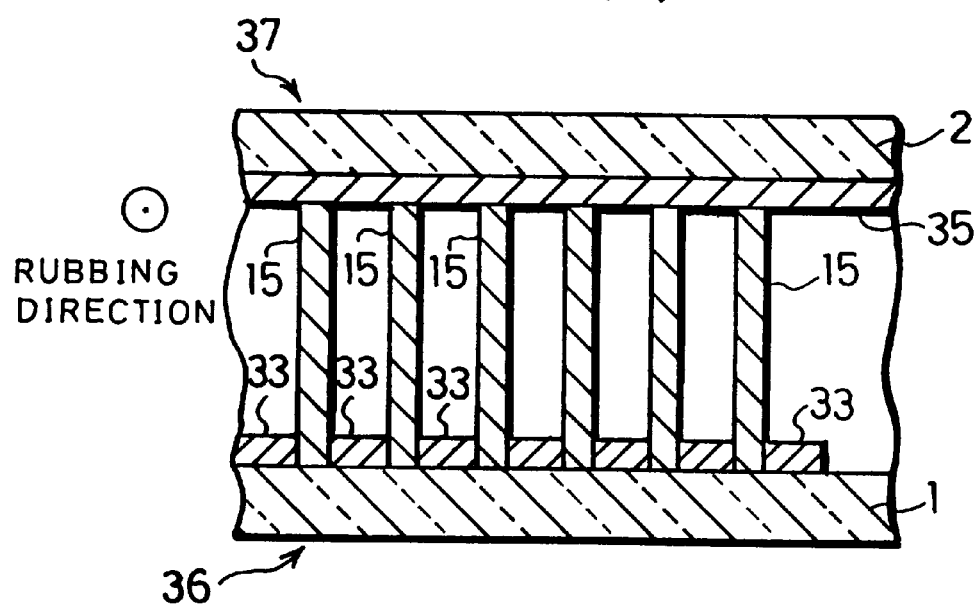
Figure 19:
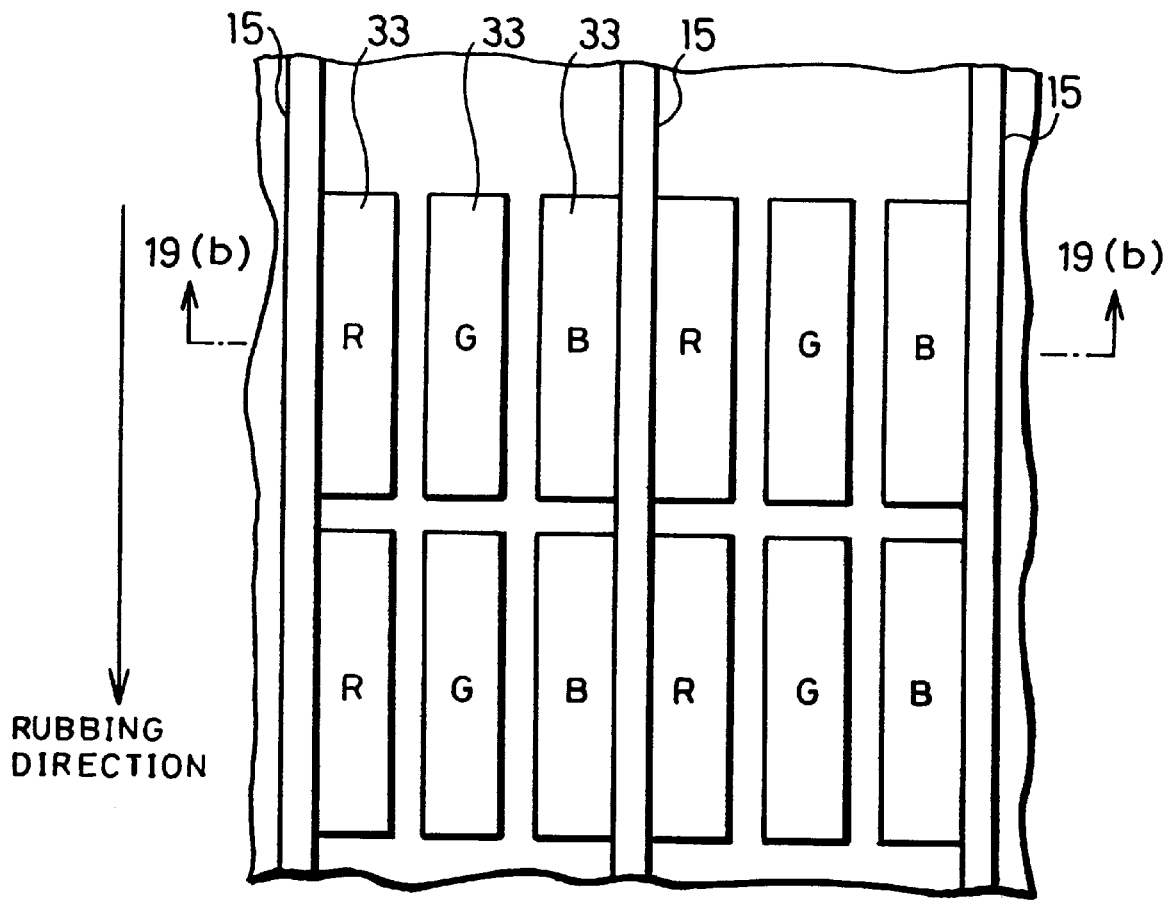
FIG. 19(*a*) is a plain view showing a structure of electrodes of a liquid crystal display apparatus of a second variation example of the third embodiment in accordance with the present invention.
Figure 19:
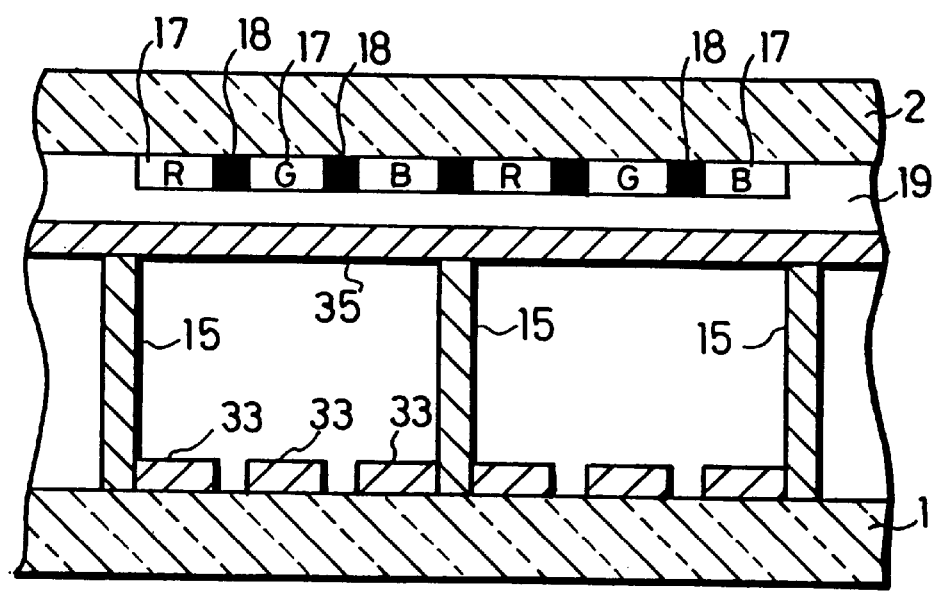
Figure 21A:
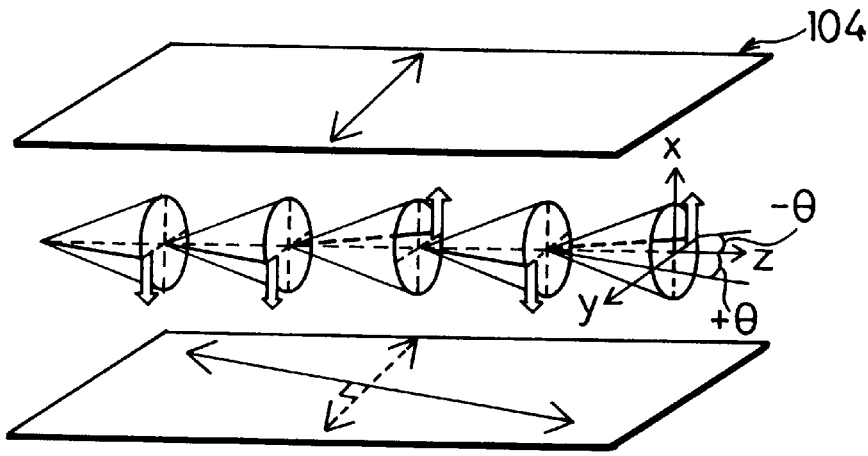
FIG. 21(*a*) is a perspective view showing a molecular helical structure unwinding in a cell having a smaller gap than a helical pitch of ferroelectric liquid crystal.
FIG. 21(b) is a perspective view showing longer axes and directions of spontaneous polarization of the liquid crystal molecules which are uniformly oriented in the cell.
FIG. 21(c) is a perspective view showing orientation of liquid crystal molecules having switched from a state shown in FIG. 21(b).
Figure 21B:
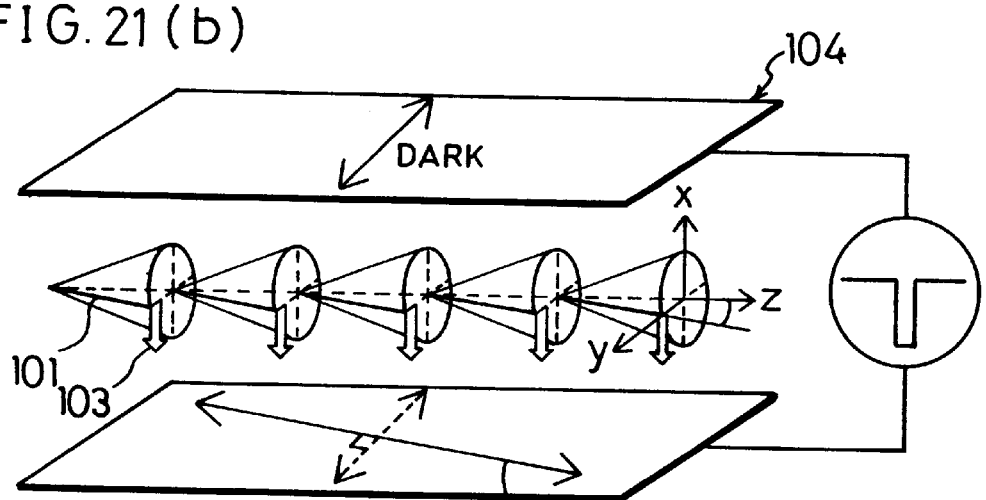
Figure 21C:
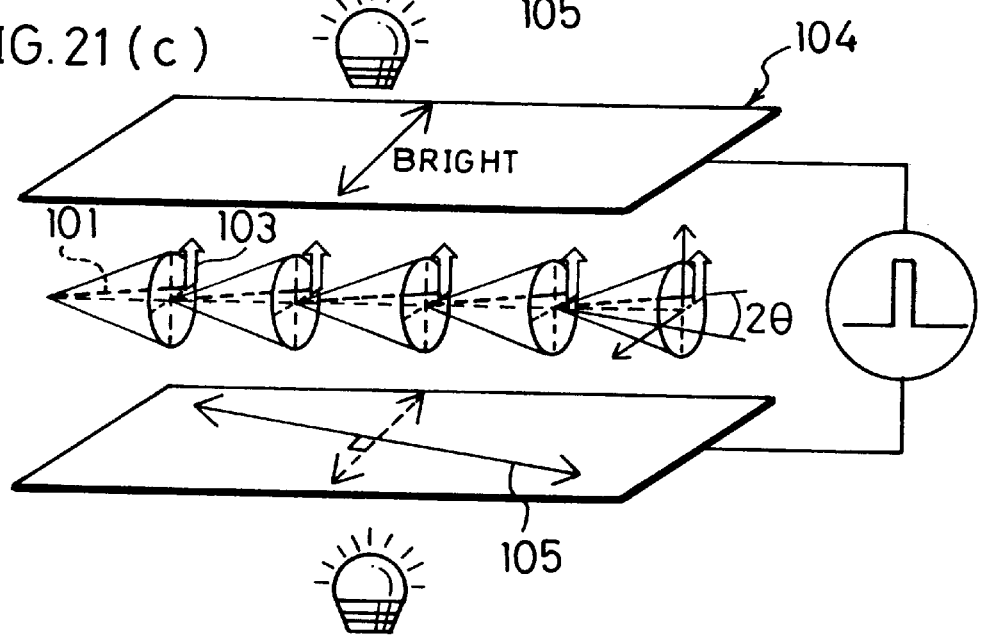
Figure 22:
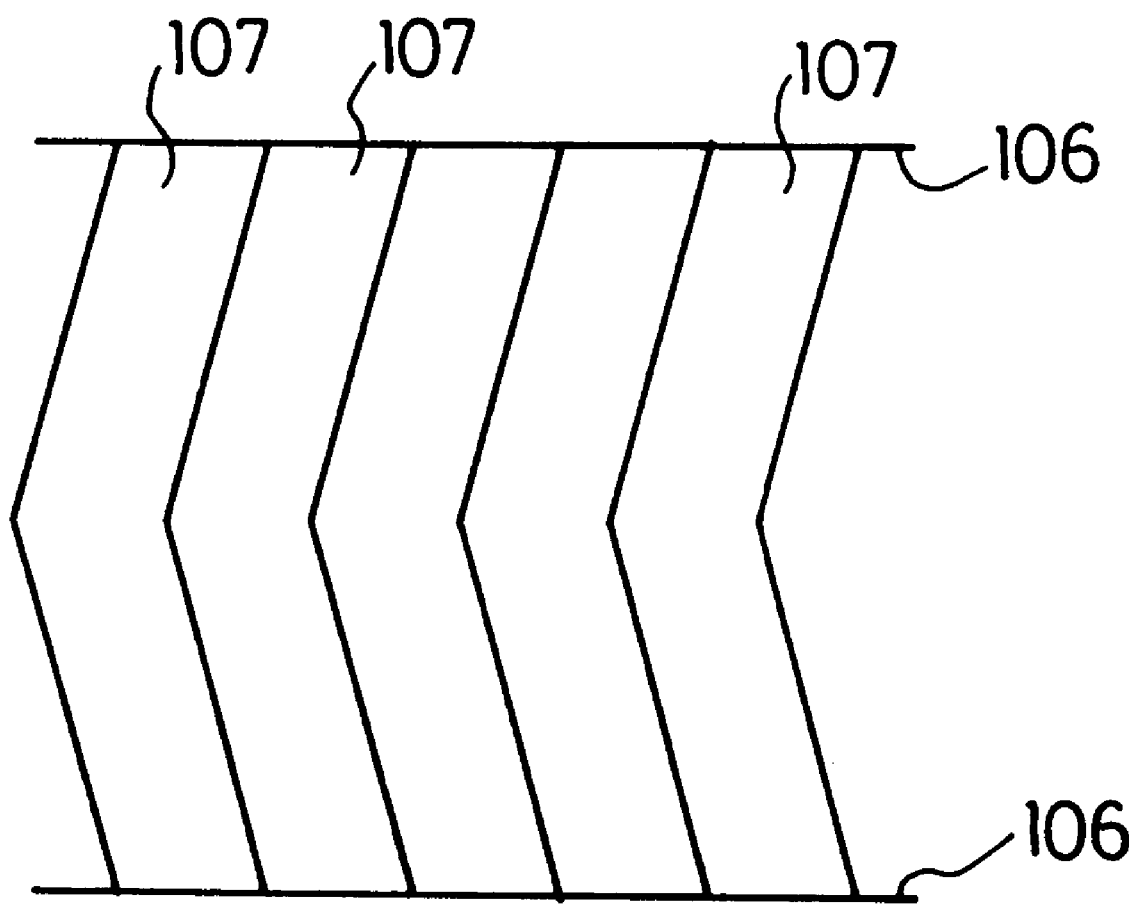
FIG. 22 is a front view showing a chevron structure of each smectic layer.
Figure 23A:
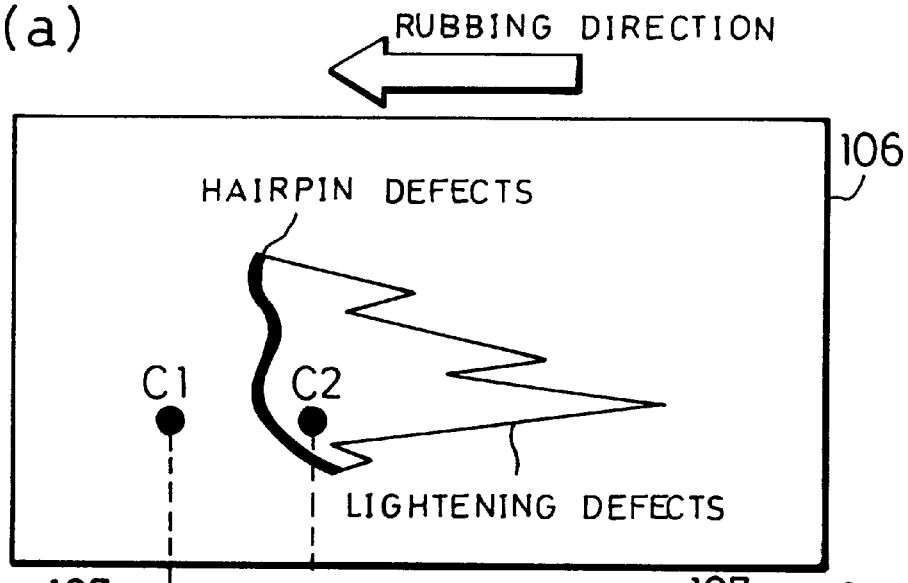
FIG. 23(a) is an explanatory drawing showing zig zag defects appearing on a display plane.
Figure 23B:
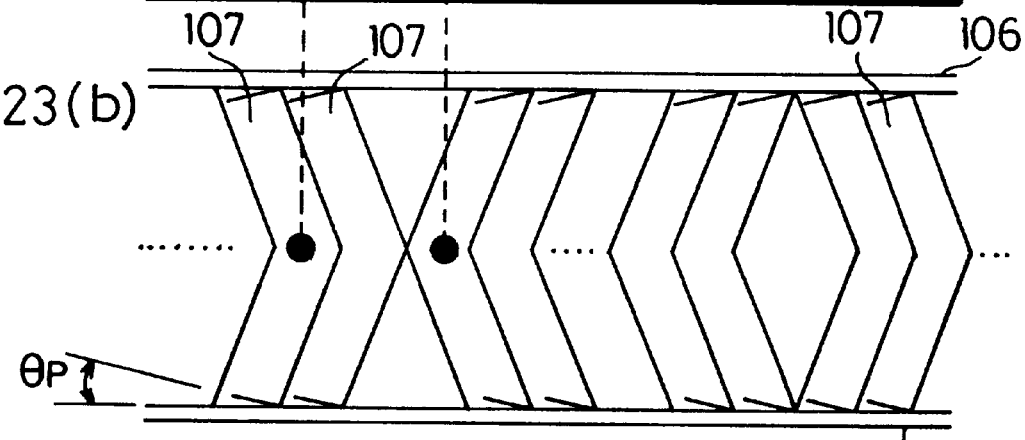
FIG. 23(b) is a front view showing a chevron structure causing zig zag defects.
Figure 23C:
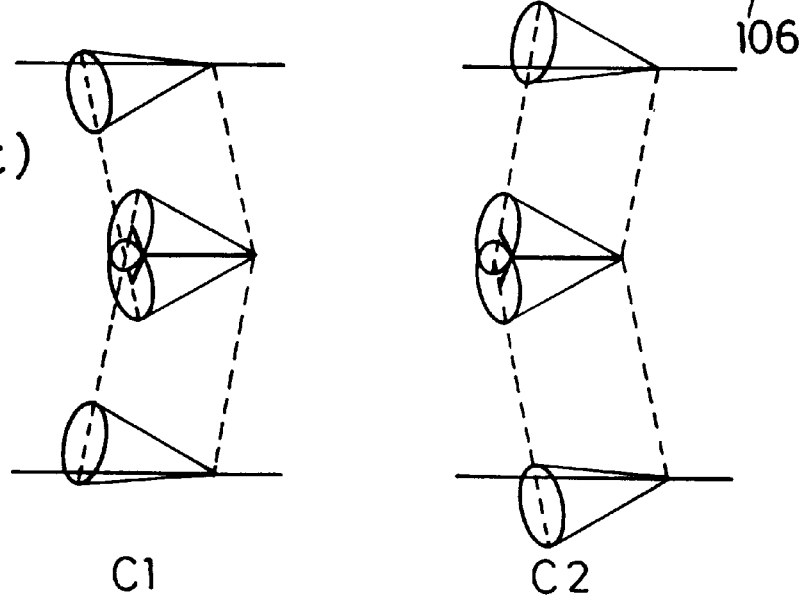
FIG. 23(c) is a perspective view showing a model of an orientational state of liquid crystal molecules in a vicinity of a place where zig zag defects occur.

On the other hand, as shown in FIG. 16, if the direction of the rubbing treatment is parallel to a width the pixel electrodes 33, since the C2U and C1T orientations coexist in mixture, zig zag defects occur between the source lines 32 and pixel electrodes 33 and extend in the rubbing direction.

Liquid crystal display apparatuses of the present embodiment were made, varying the length and width of the pixel electrode 33 and the materials for the orientating films 7 and 8 and liquid crystal 9.

When the liquid crystal display apparatuses were made, the length and width of the pixel electrode 33 were specified to be in a range of 200 to 500 μm and in a range of 50 to 300 μm respectively. The same materials as in the liquid crystal display apparatus of the first variation example of the first embodiment were used for the insulating film, orientation films 7 and 8, and liquid crystal 9.

A uniform C2U orientation was easily obtained over the whole display area of all the liquid crystal display apparatuses made in this manner by adjusting rubbing conditions.

A liquid crystal display apparatus was made, employing the same configuration except that the rubbing treatment was carried out parallelly to the width of pixel electrode 33. Despite that the rubbing conditions were adjusted, many zig zag defects occurred, and no uniform C2U orientation was obtainable with the liquid crystal display apparatus in most cases.

As mentioned above, for the liquid crystal display apparatus of the present embodiment, the uniform C2U orientation with no orientational defects can be obtained by carrying out the rubbing treatment to the orientating films 7 and 8 parallelly to a lengthwise direction of the pixel electrode 33. Therefore, the present liquid crystal display apparatus can realize uniform and high-contrast display.

FIRST VARIATION EXAMPLE

Next, the following description will discuss a variation example of the present embodiment.

As shown in FIGS. 17(a) and 17(b), a liquid crystal display apparatus of the present variation example incorporates the same electrode structure as that shown in FIG. 15(b) and further includes spacers 15. The spacers 15 are disposed parallelly to a lengthwise direction of the pixel electrodes 33 in respective electrode spaces on the source lines 32, i.e., disposed so as to form stripes.

A liquid crystal display apparatus having the above configuration was made. When the liquid crystal display apparatus was made, the length and width of the pixel electrode 33 were specified to be in a range of 200 to 500 μm and in a range of 50 to 300 μm respectively. The spacers 15 having a thickness of 1.5 μm were formed in the same manner as in the second variation example of the first embodiment. The liquid crystal display apparatus was tested for shock resistance in the same manner.

A uniform C2U orientation was easily obtained over the whole display area of all the liquid crystal display apparatuses made in this manner by adjusting the rubbing conditions. Besides, the orientation was not disturbed when a shock was applied to the liquid crystal display apparatuses.

As shown in FIGS. 18(a) and 18(b), a liquid crystal display apparatus was made as a comparative example of the above liquid crystal display apparatus, employing spacers 16 of the same material as the spacers 15 disposed parallelly to a width of the pixel electrodes 33 in respective electrode spaces on the gate lines 31 and employing a parallel rubbing direction to that width. This liquid crystal display apparatus exhibited enough shock resistant property. Nevertheless, despite that the rubbing conditions were adjusted, many zig zag defects occurred, and no uniform C2U orientation was obtainable with the liquid crystal display apparatus.

Note that the orientating films 7 and 8, etc. are omitted in FIGS. 17(a), 17(b), 18(a) and 18(b) mentioned above and FIGS. 19(a) and 19(b) mentioned later for convenience of showing locations of the pixel electrodes 33 and the spacers 15 and 16. Note also that the thin film transistors 34 are omitted in FIGS. 17(a), 17(b), 18(a), 18(b), 19(a) and 19(b) for convenience.

SECOND VARIATION EXAMPLE

Next, the following description will discuss another variation example of the present embodiment.

For a liquid crystal display apparatus of the present variation example, micro color filters 17 and light blocking members 18 are alternately provided on the glass substrate 2 as shown in FIGS. 19(a) and 19(b). The micro color filters 17 are covered with an overcoating layer 19, and common electrodes 35 are formed on the overcoating layer 19.

The pixel electrodes 33 formed on the glass substrate 1 are disposed so as to correspond to the respective red, green and blue micro color filters 17 for one pixel. A spacer 15 is provided in an electrode space along a lengthwise direction of the pixel electrodes 33 for every pixel. Alternatively, the spacer 15 may be disposed for every plurality of pixels. Rubbing treatment is carried out in the same direction as in the above first variation example.

A uniform C2U orientation was easily obtained over the whole display area of all the liquid crystal display apparatuses made in this manner. Besides, the orientation was not disturbed when a shock was applied to the liquid crystal display apparatuses. Moreover, since intervals between the spacers 15 are determined for each pixel, when liquid crystal material was injected, an enough amount of the liquid crystal material was injected in all the pixels.

When space dividing gradation display is to realized, pixel electrodes corresponding to the red, green and blue colors are divided as in the third variation example of the first embodiment. This is not shown in any drawing.

The present embodiment has been referring to a liquid crystal display apparatus using the TFT 34 as a switching element. However, alternatively, the same effects can be obtained as long as a liquid crystal display apparatus has a structure including a pixel electrode and an opposite electrode: e.g., a liquid crystal display apparatus using a Metal Insulator Metal (MIM) element.

Moreover, the present embodiment has been referring to a configuration where the pixel electrodes 33 are disposed parallelly side by side. However, there are alternative configurations for the pixel electrodes 33: e.g., a so-called delta configuration where the pixel electrodes 33 corresponding to the red, green and bluecolors are configured to form a triangle.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A liquid crystal display apparatus, comprising:

a pair of transparent electrode substrates, each of which includes: an insulating and transparent substrate; a plurality of electrodes disposed to form stripes on the substrate; and an orientating film to cover the electrodes, the electrode substrates being disposed to face each other so that the electrodes on one of the electrode substrates cross the electrodes on the other electrode substrate; and ferroelectric liquid crystal injected between the electrode substrates, wherein one of the electrode substrates provided with more electrodes in a predetermined area than the other receives a uniaxial orientation treatment parallelly or almost parallel to a lengthwise direction of the electrodes thereof, the other electrode substrate receives a uniaxial orientation treatment perpendicularly or almost perpendicularly to a lengthwise direction of the electrodes thereof, and the electrode substrates are disposed so that the orientation directions thereof become parallel or almost parallel to each other.

2. The liquid crystal display apparatus as defined in claim 1, further comprising interval maintaining bodies for maintaining an interval between the two electrode substrates and for combining the two electrode substrates, wherein the interval maintaining bodies are disposed, between neighboring pairs of the electrodes of one of the electrode substrates which is provided with more electrodes in the predetermined range than the other, parallel to a lengthwise direction of those electrodes so as to form stripes.

3. The liquid crystal display apparatus as defined in claim 2, wherein the electrodes are provided in a plurality in a display area for one pixel, and the interval maintaining body is disposed in a boundary of neighboring display areas for one pixel.

4. The liquid crystal display apparatus as defined in claim 3, further comprising a plurality of color filters in a display area for one pixel, wherein the electrodes in the display area for one pixel correspond to the respective color filters in the same display area.

5. The liquid crystal display apparatus as defined in claim 3, wherein the electrodes in a display area for one pixel are provided in accordance with a number of divisions for space dividing gradation display.

6. The liquid crystal display apparatus as defined in claim 2, further comprising a plurality of color filters in a display area for one pixel, wherein the electrodes are provided in a plurality in the display area for one pixel and correspond to the respective color filters in the same display area, and the interval maintaining bodies are disposed between all neighboring pairs of the color filters.

7. The liquid crystal display apparatus as defined in claim 6, wherein the electrodes in the display area for one pixel are provided in accordance with a number of divisions for space dividing gradation display.

8. A liquid crystal display apparatus, comprising:

a pair of transparent electrode substrates, each of which includes: an insulating and transparent substrate; a plurality of electrodes disposed to form stripes on the substrate; and an orientating film to cover the electrodes, the electrode substrates being disposed to face each other so that the electrodes on one of the electrode substrates cross the electrodes on the other electrode substrate; and ferroelectric liquid crystal injected between the electrode substrates, wherein one of the electrode substrates, which is provided with the narrowest electrode, receives a uniaxial orientation treatment parallel or almost parallel to a lengthwise direction of the electrodes thereof, the other electrode substrate receives a uniaxial orientation treatment perpendicularly or almost perpendicularly to a lengthwise direction of the electrodes thereof, and the electrode substrates are disposed so that the orientation directions thereof become parallel or almost parallel to each other.

9. The liquid crystal display apparatus as defined in claim 8, further comprising interval maintaining bodies for maintaining an interval between the two electrode substrates and for combining the two electrode substrates, wherein the interval maintaining bodies are disposed, between neighboring pairs of the electrodes of one of the electrode substrates which is provided with the narrowest electrode, parallel to a lengthwise direction of those electrodes so as to form stripes.

10. The liquid crystal display apparatus as defined in claim 9, wherein the electrodes are provided in a plurality in a display area for one pixel, and the interval maintaining body is disposed in a boundary of neighboring display areas for one pixel.

11. The liquid crystal display apparatus as defined in claim 10, further comprising a plurality of color filters in a display area for one pixel, wherein the electrodes in the display area for one pixel correspond to the respective color filters in the same display area.

12. The liquid crystal display apparatus as defined in claim 10, wherein the electrodes in a display area for one pixel are provided in accordance with a number of divisions for space dividing gradation display.

13. The liquid crystal display apparatus as defined in claim 9, further comprising a plurality of color filters in a display area for one pixel, wherein the electrodes are provided in a plurality in the display area for one pixel and correspond to the respective color filters in the same display area, and the interval maintaining bodies are disposed between all neighboring pairs of the color filters.

14. The liquid crystal display apparatus as defined in claim 13, wherein the electrodes in the display area for one pixel are provided in accordance with a number of divisions for space dividing gradation display.

15. A liquid crystal display apparatus, comprising:

a pixel electrode substrate including an insulating and transparent substrate, a plurality of pixel electrodes disposed to form a matrix on the substrate, and an orientating film to cover the pixel electrodes;

an opposite electrode substrate including an insulating and transparent substrate, an opposite electrode disposed on the substrate, and an orientating film to cover the opposite electrode, the opposite electrode substrate being disposed to face the pixel electrode substrate so that the opposite electrode and the pixel electrodes face each other; and ferroelectric liquid crystal injected between the pixel electrode substrate and the opposite electrode substrate, wherein the pixel electrode substrate receives a uniaxial orientation treatment parallel or almost parallel to a lengthwise direction of the pixel electrodes thereof, and the opposite electrode substrate receives a uniaxial orientation treatment parallel or almost parallel to the uniaxial orientation treatment of the pixel electrode substrate.

16. The liquid crystal display apparatus as defined in claim 15, further comprising interval maintaining bodies for maintaining an interval between the pixel electrode substrate and the opposite electrode substrate and for combining the electrode substrates, wherein the interval maintaining bodies are disposed between neighboring pairs of the pixel electrodes parallel to a lengthwise direction of the pixel electrodes so as to form stripes.

17. The liquid crystal display apparatus as defined in claim 16, wherein the electrodes are provided in a plurality in a display area for one pixel, and the interval maintaining body is disposed in a boundary of neighboring display areas for one pixel.

18. The liquid crystal display apparatus as defined in claim 17, further comprising a plurality of color filters in a display area for one pixel, wherein the pixel electrodes in the display area for one pixel correspond to the respective color filters in the same display area.

19. The liquid crystal display apparatus as defined in claim 17, wherein the pixel electrodes in a display area for one pixel are provided in accordance with a number of divisions for space dividing gradation display.

20. The liquid crystal display apparatus as defined in claim 15, further comprising a plurality of color filters in a display area for one pixel, wherein the pixel electrodes are provided in a plurality in the display area for one pixel and correspond to the respective color filters in the same display area, and the interval maintaining bodies are disposed between all the neighboring color filters.

21. The liquid crystal display apparatus as defined in claim 20, wherein the pixel electrodes in the display area for one pixel are provided in accordance with a number of divisions for space dividing gradation display.

* * * * *